US007606742B2

(12) United States Patent
Bright et al.

(10) Patent No.: US 7,606,742 B2
(45) Date of Patent: Oct. 20, 2009

(54) PRE-PROCESSOR FOR INBOUND SALES ORDER REQUESTS WITH LINK TO A THIRD PARTY AVAILABLE TO PROMISE (ATP) SYSTEM

(75) Inventors: Marion Scott Bright, Charlotte, NC (US); Pushpalatha Channikere, South Burlington, VT (US); Balasubramanian Gopalan, South Burlington, VT (US); Rahul Jindani, South Burlington, VT (US); Jinraj Dhruvakumar Joshipura, Medford, MA (US); Vinod Kannoth, South Burlington, VT (US); Jayakumar Krishnamurthy, Malden, MA (US); Gregory Lee McKee, Charlotte, NC (US); Sylvain Michel, St-Hubert (CA); Penny Jeannette Peachey-Kountz, South Burlington, VT (US); James Donald Scott, Charlotte, NC (US)

(73) Assignee: International Business Machines Corporation, Armonk, NY (US)

( * ) Notice: Subject to any disclaimer, the term of this patent is extended or adjusted under 35 U.S.C. 154(b) by 1178 days.

(21) Appl. No.: 09/303,368

(22) Filed: Apr. 30, 1999

(65) Prior Publication Data

US 2002/0013731 A1    Jan. 31, 2002

(51) Int. Cl.
*G06Q 10/00* (2006.01)
(52) U.S. Cl. .............................. 705/28; 705/26; 705/27; 705/29; 705/25; 705/1
(58) Field of Classification Search .................. 705/28, 705/5, 6, 16, 20, 21, 22, 26
See application file for complete search history.

(56) References Cited

U.S. PATENT DOCUMENTS 5,517,406 A    5/1996    Harris et al.
5,570,291 A    10/1996   Dudle et al.
5,577,258 A    11/1996   Cruz et al.

(Continued)

FOREIGN PATENT DOCUMENTS

EP    0 425 405 A2    5/1991

(Continued)

OTHER PUBLICATIONS

Japanese Office action dated Feb. 18, 2003.

(Continued)

*Primary Examiner*—Matthew S. Gart
*Assistant Examiner*—Garcia Ade
(74) *Attorney, Agent, or Firm*—Ryan K. Simmons; Greenblum & Bernstein P.L.C.

(57) ABSTRACT

A method and apparatus for pre-processing electronic data requests within the EDI subsystem layer and within the order fulfillment application system. An order interceptor, third-party Available To Promise (ATP) interface, pseudo-sales order workbench, and the reject acknowledgment system processes are provided within the order fulfillment application system to accomplish the pre-processing. The order interceptor performs an asynchronous availability check before a sales order is posted. The result of the ATP check is stored in an ESO, and is applied during the posting process with unique user exits. The result of the ATP check is also used to determine key information about the sales order, such as the sales organization, and division and distribution channels. The pre-processor uses business rules to determine if the ESO should be split into multiple documents for requests satisfied across multiple sales areas. The Workbench provides a customer purchase order view of the ESO that looks, feels and behaves like actual order entry screens. The Workbench also displays messages generated from the pre-processor describing why the ESO was held for review. After the condition is corrected the Workbench re-executes the ESO pre-processor. This continues until all messages are corrected or marked reviewed. The supplier can decide to either accept the request, reject the request or accept individual line items.

17 Claims, 8 Drawing Sheets

U.S. PATENT DOCUMENTS

| | | | |
|---|---|---|---|
| 5,594,910 | A | 1/1997 | Filepp et al. |
| 5,752,246 | A | 5/1998 | Rogers et al. |
| 5,893,076 | A | 4/1999 | Hafner et al. |
| 5,893,131 | A | 4/1999 | Kornfeld |
| 6,023,683 | A * | 2/2000 | Johnson et al. ............... 705/26 |
| 6,058,373 | A * | 5/2000 | Blinn et al. ............... 705/28 X |

FOREIGN PATENT DOCUMENTS

| | | |
|---|---|---|
| EP | 0 459 626 A2 | 12/1991 |
| EP | 0 863 678 A2 | 9/1998 |
| GB | 2 202 664 A | 9/1988 |
| JP | 06-028275 | 2/1994 |
| JP | 08-030695 | 2/1996 |
| JP | 10-027119 | 1/1998 |
| WO | WO 96/20952 | 7/1996 |

OTHER PUBLICATIONS

European Search Report dated Jan. 20, 2004.

Markell, Cliff, "Do-It-Yourself EDI", Apparel Industry Magazine, vol. 57, No. 8, Aug. 1996, pp. 62-64.

Brigham G. et al., "An N-Dimensional Data Structure in Support of Electronic Data Interchange (EDI) Translation" Proceeding of the International Conference on APL. Palo Alto, Aug. 4-8, 1991, New York, IEEE, US, pp. 71-79.

Adam N R et al., "EDI Through a Distributed Information Systems Approach" System Sciences, 1998., Proceedings of the Thirty-First Hawaii International Conference on Kohala Coast, HI, USA, Jan. 1998, pp. 354-363.

Marsaud D., "Electronic Data Interchange (EDI)-definition-justification-implementation", Compeuro '93. 'Computers in Design, Manufacturing, and Production', Proceedings, Pris-Evry, France May 1993, pp. 358-364.

Whalen J., "EDI . . . the SAP connection", EDI Forum, 1997, EDI Group, USA, vol. 10, No. 1, pp. 46-56.

European Office Action dated Jul. 28, 2004.

* cited by examiner

CUSTOMER PO (PRE-SALES ORDER) DELIVERY SCHEDULES
EDIT  ITEM  ENVIRONMENT  REPORTS  SYSTEM  HELP

NEXT ITEM | WORKBENCH TEXTS | MAU SALES VIEW

CUSTOMER DATA
PO NUMBER  INTERNAL ZIPRI
ITEM  1
MATERIAL

IBM MATERIAL  0000053H2504  4MXH 5U 12/10 300S0J
DELIVERY PLANT  BTU1  MOQ 1,250  SPQ 1,250

ALL DELIVERY SCHEDULES FOR ITEM
SCHEDULE  SHIP DATE   QUANTITY   SHIPPED QUANTITY
1         10/02/1998  150.000    0.000

1 OF 1

RLS (1) (0/7) | CAPN27 | OYR, 04:35PM

PRE-PROCESSOR FOR INBOUND SALES ORDER REQUESTS WITH LINK TO A THIRD PARTY AVAILABLE TO PROMISE (ATP) SYSTEM

BACKGROUND OF THE INVENTION

1. Field of the Invention

The present invention generally relates to pre-processing electronic commerce requests and, more particularly, to a method and system for modifying electronic commerce requests before they are sent to an order processing system.

2. Background Description

Electronic Data Interchange (EDI) is a fast, inexpensive and safe method of communicating purchase orders, invoices, ship notices, test results, and other frequently used business documents between two trading partners without human intervention. EDI eliminates paperwork and informational delays by allowing two or more computers to communicate directly. This is accomplished by having all parties follow an agreed upon EDI data format and communication standard.

Minimum requirements for EDI participation include a computer system such as a PC, mini or mainframe; translation software to map internal business transactions to and from EDI standard formats; communication software to send and receive EDI files, and support communication protocols; and communication hardware such as a modem and a telephone line. EDI has three essential components. First, there must be an EDI standard that defines a set of commonly agreed upon data format and communication standards. Second, there must be a communications information delivery system, which may include telecommunications hardware and software as well as general communication protocols. Finally, translation software is required, which transforms data into a format that can be read by an otherwise incompatible system or network at either end of a transmission.

For example, a computer application creates a business transaction (document) which is loaded into a file. This file is processed by the EDI translation software where it is mapped into an EDI standard data format. This EDI record is then communicated over a telecommunication link to a predetermined business partner. This business or trading partner decodes the EDI record by processing it through their EDI translation software, and dumps the information into an internal file. This file is then loaded into the trading partners business application.

As shown in FIG. 1, electronic data requests are sent directly from the customer to the order fulfillment system for processing. Disadvantages of this approach include data replication of master, control, and configuration data to the EDI subsystem, and non-integration with the order fulfillment embedded processing rules. Specifically, in prior art systems, an EDI order from a customer is received, as shown in function block In function block 102, the EDI order is translated into an internal format. The internally formatted data is then loaded into the order fulfillment system, as shown in function block 103. In decision block 104 the order fulfillment system checks for errors, such is incomplete fields within the EDI order, or determining if the sender is asking for a product or service that does not exist. If there are no errors, the EDI order is processed manually in accordance with business rules. For example, if there is a request for a specific date and quantity, business rule 1 might be to respond only if the date and quantity requested can be satisfied. Rule 2 might be to keep the date, and take whatever quantity that is available. Rule 3 might be to substitute a different part number for the original part requested if there are not enough of the original parts requested to satisfy the order. If the EDI order does contain errors, then, in function block 106, the operator must manually correct the order. For example, missing fields may be filled in, or information such as a correct customer address may be provided. In function block 107, the EDI order is resubmitted, where it is again checked for errors, as shown in function block 104. Steps 104, 106 and 107 are repeated until decision block 104 determines that the EDI order does not contain any errors.

Several patents relate to the pre-processing of presentation, documents, and the like. These pre-processing systems are not, however, directly applicable to EDI and have shortcomings with respect to EDI applications. U.S. Pat. No. 5,577,258 to Cruz et al. discloses an apparatus and method for pre-processing multimedia presentations to be delivered to customers such that delays due to interactive response time are virtually eliminated. This method, however, is not directly applicable to EDI applications.

European Pat. No. EP 0 863 678 A2 to Kung discloses a method for automated service provisioning for telecommunications companies. Data from a caller is validated to determine whether the caller is an existing customer entitled to a requested service. Requests are converted into data compatible with the processor of the automated method.

PCT Pat. No. WO 96/20952 to Lucas discloses a central pre-processing system with logistics for documents as well as system access based on subscriber identities at the operator of telecommunications system. Document related data is pre-processed and stored, and rules for standardized processing of document information are provided. U.S. Pat. No. 5,594,910 to Filepp et al. discloses a distributed processing, interactive network and method of operation. The method discloses a way to provide access to large numbers of applications to a large number of users, and different methods to streamline the data accesses. U.S. Pat. No. 5,752,246 to Rogers et al. discloses a World Wide Web browser to fulfill requests from different clients, and a way of requesting, processing and presenting information on the WWW. U.S. Pat. No. 5,517,406 to Harris et al. discloses a tool for handling mutual fund related data, where a mutual fund trade is priced, extended and trade-acknowledgment is confirmed by a pre-processor. These patents are not, however, directly applicable to EDI, and do not provide the realization of the features or conveniences of an EDI system.

These patents are not directly applicable to EDI, and therefore do not provide or teach that there is an intelligent editor within the customer order fulfillment system, or that post-processing modifications can be made to a customer order through the order fulfillment system. It is therefore an object of the present invention to provide an integrated system and method for pre-processing electronic data requests before they are sent to an order processing system that provides a planning and forecasting engine that determines if material is available for a given quantity and delivery date. These systems also do not enable corrections to be made to electronic data requests before they are sent to an order processing system. Nor do these systems allow electronic data requests to be rejected so that they are not sent to an order processing system when certain criteria specified within the electronic data request cannot be satisfied.

SUMMARY OF THE INVENTION

It is therefore an object of the present invention to provide an integrated system and method for pre-processing electronic data requests before they are sent to an order processing system.

It is another object of the present invention to provide an interface to a system that provides a planning and forecast engine that determines if a material is available for a given quantity and delivery date.

It is yet another purpose of the present invention to provide a system and method for making corrections to electronic data requests before they are sent to an order processing system.

It is yet another purpose of the present invention to provide a system and method for rejecting electronic data requests so that they are not sent to an order processing system when certain criteria specified within the electronic data request cannot be satisfied.

To this end, it is proposed to provide a computer implemented order interceptor that pre-processes Electronic Sales Orders (ESOs), an interface to a third party planning and forecast engine, a pseudo-sales order workbench that allows ESOs to be corrected before they are sent to the order processing system, and a reject acknowledgment system that rejects ESOs when the ESO contains errors or the ESO cannot be satisfied.

Accordingly, in the preferred embodiment of the invention, a supplier enabled for electronic commerce using the SAP AG Corporation sales and distribution modules for order fulfillment can use the Electronic Sales Order (ESO) pre-processor (e.g. the order interceptor) to perform an asynchronous availability check (using, for example, the PROFIT Available to Promise (ATP) by International Business Machine Corp., or any other suitable third party software package) before the sales order is posted to the order processing system. The ATP system is the planning and forecast engine that determines if a material is available for a given quantity and delivery date. The result of the ATP check is stored in the ESO and is later applied to the order processing system. The order interceptor derives the prerequisite data for the ATP check by supplementing the ESO with SAP master and configuration data. The result of the ATP check is also used to determine key information about the sales order, such as the sales organization, and division and distribution channels (sales area).

In the preferred embodiment, the ESO pre-processor splits the ESO into multiple requests if there are multiple line items supplied by different delivery plants that are not configured to share the same sales area in SAP. Without this function, the supplier would have to perform this activity manually.

In addition to supporting a third party availability check and subsequent splitting of the ESO, the pre-processor provides a robust set of business rules that allows a supplier to configure how a request is managed. These business rules allow certain functions to be automated if specified criteria are satisfied. For example, a new sales order request from a low-tiered customer can be configured for manual service prior to posting. The same request from a high-tiered customer can be configured for manual review only under certain conditions, such as if the requester falls under minimum order quantity levels, while the same request from another customer in the same condition could be configured for automatic routing.

In the preferred embodiment, ESOs held for review can be viewed and edited by using the Workbench component of the pre-processor. The Workbench replaces the generic tool supplied by SAP AG Corporation. The Workbench provides a customer purchase order view of the ESO that looks, feels and behaves like actual order entry screens. In addition to displaying the ESO, the Workbench displays messages generated from the pre-processor describing why the ESO was held for review. When a message is executed, the Workbench branches to the appropriate data correction screen. The branch could be to a specific segment in the ESO, to master data, or to configuration data. After the condition is corrected, the Workbench re-executes the ESO pre-processor. This continues until all messages are corrected or marked reviewed. The supplier can decide to either accept the request, reject the request, or accept individual line items.

Finally, in the preferred embodiment, if the request is rejected, then an auto reject acknowledgment is generated without posting the ESO to the order processing system. If the request is accepted, then the ESO is routed to vendor supplied function modules for sales order posting the ESO to the order processing system. Partial accepts are communicated back to the customer through the outbound acknowledgment process.

There are several features of the order interceptor of the present invention that distinguish it from other pre-processors of this kind. First, the order interceptor is implemented inside of SAP's table space after the ESO is created by SAP's IDOC/ALE application layer (see FIGS. 6, 600, 601, 602, 604 and 608) and before sales order posting. All other pre-processors of this kind are implemented outside of SAP's IDOC/ALE application layer, typically on flat files that are in ESO format. With this approach, all tracking, logging and other capabilities inherent in SAP's IDOC/ALE application layer are lost. The order interceptor of the present invention is thus capable of adding, changing, and deleting ESO data segments. The hierarchy of the ESO data segments are redetermined each time changes are applied to the ESO. All changes to the ESO are logged in the ESO status segments, thus providing a full audit trail of activity. The program that rebuilds the ESO is packaged individually and can be used by other pre-processors that have the need to manipulate the ESO in this manner.

Another feature of the present invention is that the order interceptor supports an asynchronous interface to a third party ATP System running on a remote server. The result of the availability check is stored in uniquely configured ESO data segments and applied to the sales order during posting. Before initiating the availability check, the ESO order interceptor analyzes the ESO to see if ATP commits are present. If found, the availability check is bypassed and the sales order is posted with the ATP commits already on the ESO. In addition, the ESO can be split into multiple ESOs based upon the results of the ATP check. The business rules for when to split the ESO is implemented separately from how the ESO is split.

A third feature is that the order interceptor performs various edits and audits based upon business rules configured by customer, logical message type and message code. For example, one of the unique features of the present invention is to configure the system to hold the ESO for manual review when a predefined condition arises before posting to the application. This gives the supplier the opportunity to perform error detection and correction above those supplied by SAP AG Corporation. The ESO order interceptor also provides various user exits for customer specific requirements using the SAP Corporation SMOD and CMOD transactions. The SMOD and CMOD transactions allow enhancements to be made to the base functionality of the software. For example, additional processing steps can be added to the base functionality of the software. After the additional processing steps, the processing associated with the base functionality resumes.

Further, the workbench component of the order interceptor provides the supplier with a tool to change the ESO and perform any necessary error correction identified by the order interceptor. This workbench replaces a generic tool supplied by SAP. The workbench provides a unique view of the ESO so that the user does not have to know the structure and qualifiers of the ESO. The screens are presented in pre-sales order format thus giving them a preview of the "to be" sales order. In addition, the workbench provides branches to various SAP AG Corp. master and configuration data for error correction and analysis, as well as a branch to the generic tool supplied by SAP AG Corp. for ESO editing. Another unique feature of the workbench is the auto-reject function. The supplier can reject a request and generate an acknowledge without posting to the application, all within the vendor's IDOC/ALE layer.

Various objects, features aspects and advantages of the present invention will become more apparent from the following detailed description, in conjunction with the accompanying drawings, of a preferred embodiment of the invention.

BRIEF DESCRIPTION OF THE DRAWINGS

The foregoing and other objects, aspects and advantages will be better understood from the following detailed description of a preferred embodiment of the invention with reference to the drawings, in which:

FIG. 7 shows a preferred embodiment of a pre-sales overview menu screen displayed from the pseudo-sales order workbench;

FIG. 8 shows a preferred embodiment of a pre-sales order delivery schedules screen displayed from the pseudo-sales order workbench.

DETAILED DESCRIPTION OF PREFERRED EMBODIMENTS OF THE INVENTION

Figure 1:
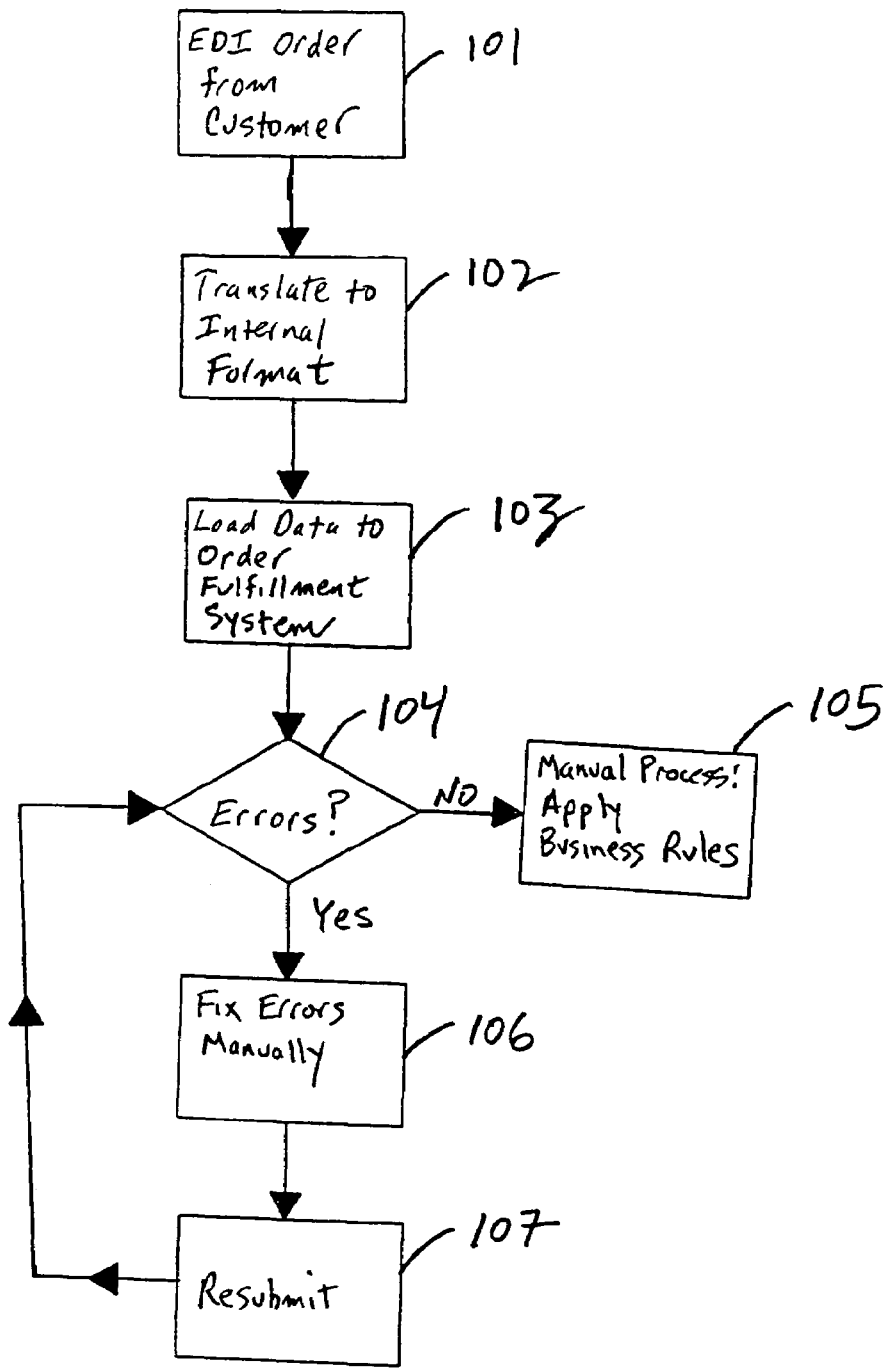
FIG. 1 is a flowchart illustrating how EDI orders are processed in accordance with conventional methods.
Figure 2:
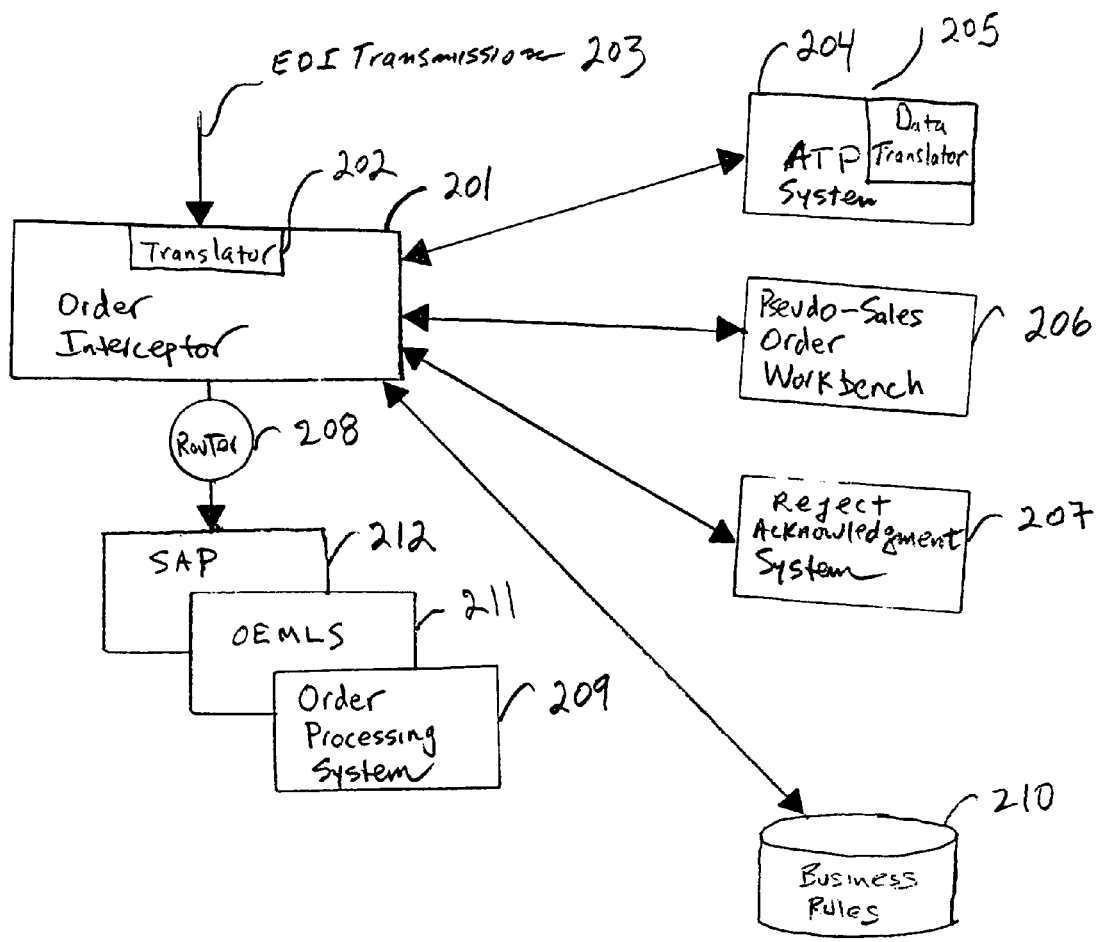
FIG. 2 is a block diagram showing a preferred embodiment of order interceptor system components.

With reference now to the drawings, and more specifically to FIG. 2, the order interceptor system which embodies the principles of the invention is shown. The order interceptor system includes an order interceptor 201 for pre-processing ESOs before they are posted to the order processing system 209. The order interceptor 201 includes a translator 202 for translating a customer's order data into an internal format. The order data is received via a standard EDI format transmission 203. After translating the customer's order data into an internal format, the order interceptor 201 begins to process the data by customer specific business rules contained in the business rules database 210. For example, a new sales order request from a low-tiered customer can be configured for manual service prior to posting. The same request from a high-tiered customer can be configured for manual review only under certain conditions, such as if the requestor falls under minimum order quantity levels, while the same request from another customer in the same condition could be configured for automatic routing. If the order interceptor 201 determines that an ATP check is needed, the order interceptor 201 will interface with ATP system 204 to collect the needed data from the data translator 205. The ATP system 204 serves as a planning and forecast engine that determines if a material is available for a given quantity and delivery date.

If the order interceptor 201 determines that any of the business rules contained in the business rules database 210 fail, or there are any other processing problems, the order interceptor 201 interfaces with a sales order workbench 206, which allows corrections to be made. The pseudo-sales order workbench 206 allows for manual review, modification, and/or corrections to the customer's order data within the internal format. The customer's order data is presented in a format as if the end user is processing an order online within the order processing system 209. The pseudo-sales order workbench 206 allows for field modifications as well as functions such as rejecting a customer's order.

If processing calls for the order to be rejected, the order interceptor 201 interfaces with the reject acknowledgment system 207 to perform that reject so that the ESO request is not processed by the order processing system 209. The reject acknowledgment system 207 takes the customer's order data in an internal format and creates an acknowledgment containing reject codes that indicate why a customer's order has been rejected. For example, one reason an order may be rejected is that there is not enough inventory on hand to satisfy the customer's order. and appropriate customer values. The reject codes are then transmitted back to the customer in a format the customer can understand so that the customer knows why the order has been rejected. The reject acknowledgment system can also reject any changes that are made to existing orders. Further, the reject acknowledgment system can also be used to reject customer forecast requests. For example, a customer may query if a certain quantity of parts can be provided, say, in 4-6 months. The reject acknowledgment system 207 again creates the reject codes, and then transmits them back to the customer in a format the customer can understand so that the customer knows why the forecast has been rejected.

After the order interceptor 201 has pre-processed the customer's data, as described above, a router 208 routes the data to the designated order processing system 209, such as the IBM Corporation's OEMLS order processing system 211 or the SAP AG Corp. order processing system 212, by interpreting the customer specific configuration. For example, if a customer has a request for parts to be delivered on his dock as the request date, this can be called the dock date. A ship date may be defined as when a customer wants the parts shipped from a supplier. Another configuration may be based on transit time, which can be factored in to the order so that the customer will receive the order on or before the date requested.

Preferably, the present invention uses IBM RS6000 engines running under a common umbrella, utilizing the AIX operating system (the IBM Corp. version of the UNIX operating system), and connected with a high speed computers, such as stand alone UNIX or Windows NT work stations, or workstations in a network. Mainframes, including IBM AS400 and ES9000 computers, may also be utilized.

Figure 3:
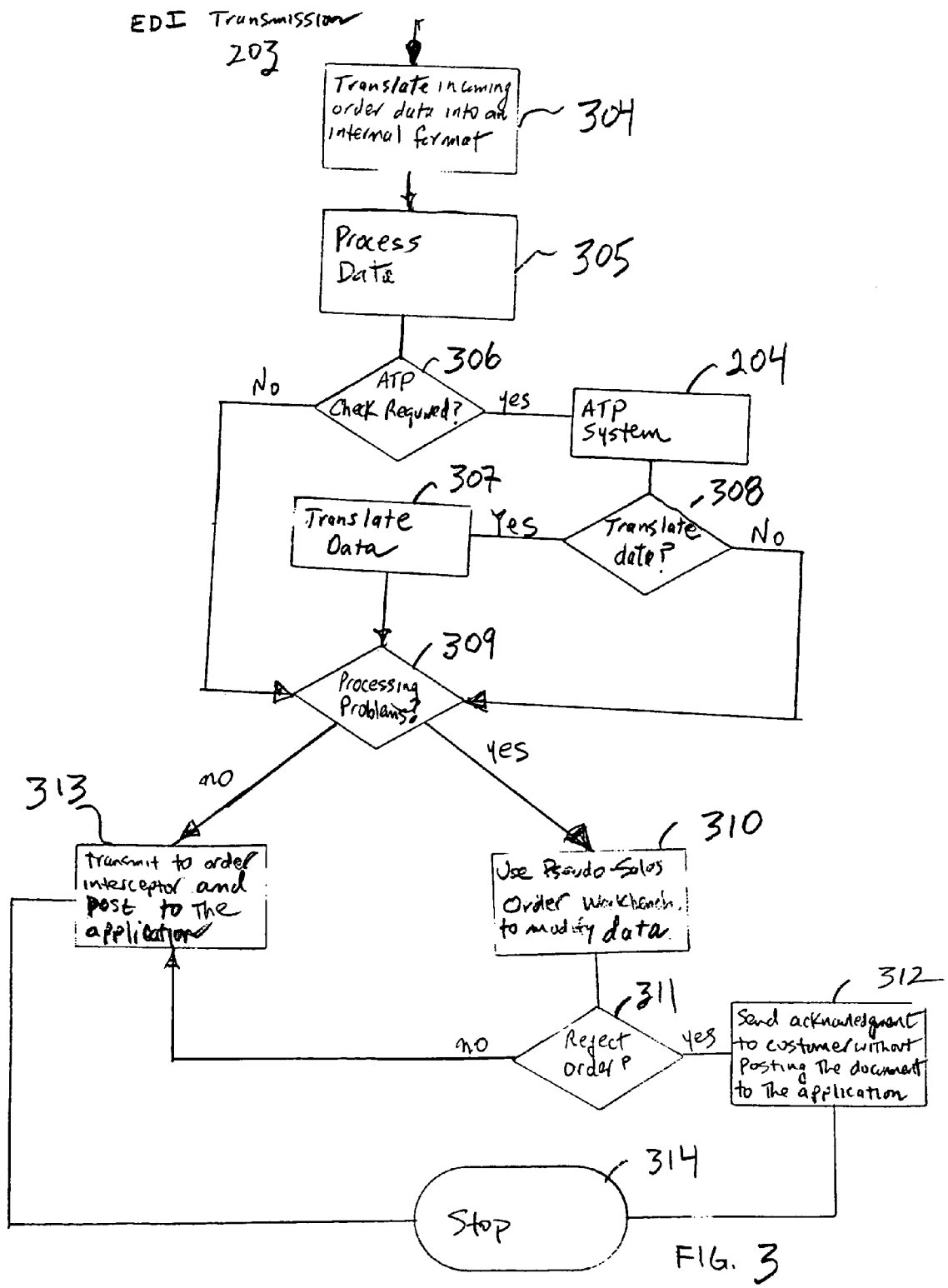
FIG. 3 is a flowchart illustrating the overall process of pre-processing orders before they are posted to the order processing system according to the present invention.

In FIG. 3, the major steps involved in the pre-processing of an incoming sales order are shown. The process starts when the order interceptor translator 202 receives a standard EDI transmission 203. Upon receipt, the translator 202 translates the EDI transmission 203 data into an internal format, as shown in function block 304. Fields such as sales area and delivering plant are derived and added back to the inbound ESO, and fields such as order quantity and ship date may be altered.

In function block 305, the order interceptor 202 processes the data contained within the EDI transmission 203. During processing, the order interceptor 201 determines if an ATP check is needed, as shown in decision block 306. The ATP system, shown in function block 204 is the planning and forecast engine that determines if a material is available for a given quantity and delivery date. If the result of the test performed in decision block 306 indicates that an ATP check is required, the order interceptor 201 interfaces with the ATP system 204. In decision block 308, the ATP system 204 tests to determine if the ESO data needs to be translated into an internal format. If yes, the ESO is translated by the data translator 205, as shown in function block 307. After data is added in function block 307, or if the test in decision block 306 indicates that ATP processing is not required, or if the test in decision block 308 indicates that data does not need to be added, a test is then made in decision block 309 to determine if there are any other processing problems, or if any of the business rules 210 have failed.

If it is determined in decision block 309 that the ESO does not satisfy all of the applicable business rules 210, or if the ESO is incomplete, in error, or requires manual review, then the order interceptor 201 creates a workflow item that can be executed from the in-basket of a responsible person so the workflow item can be reviewed and modified by using the pseudo-sales order workbench 206, as shown in function block 310.

Within the pseudo-sales order workbench 206, a test is made in decision block 311 to determine if the ESO has been rejected. The pseudo-sales order workbench 206 allows for manual review, modification, and/or corrections to customer order data within an internal format. The customer's order data is presented in a format as if the end user is processing an order online within the order processing system 209. It allows for field modifications as well as functions such as rejecting a customer's order. If the ESO is rejected, then an acknowledgment is generated back to the customer without posting the ESO to the order processing system 209, as shown in function block 312. If the ESO is not rejected by pseudo-sales order workbench 206, then the ESO is transmitted to the order processing system 209 and posted to the application, as shown in function block 313. After the appropriate action in function block 312 or 313, the process stops, as shown in termination block 314.

Figure 4:
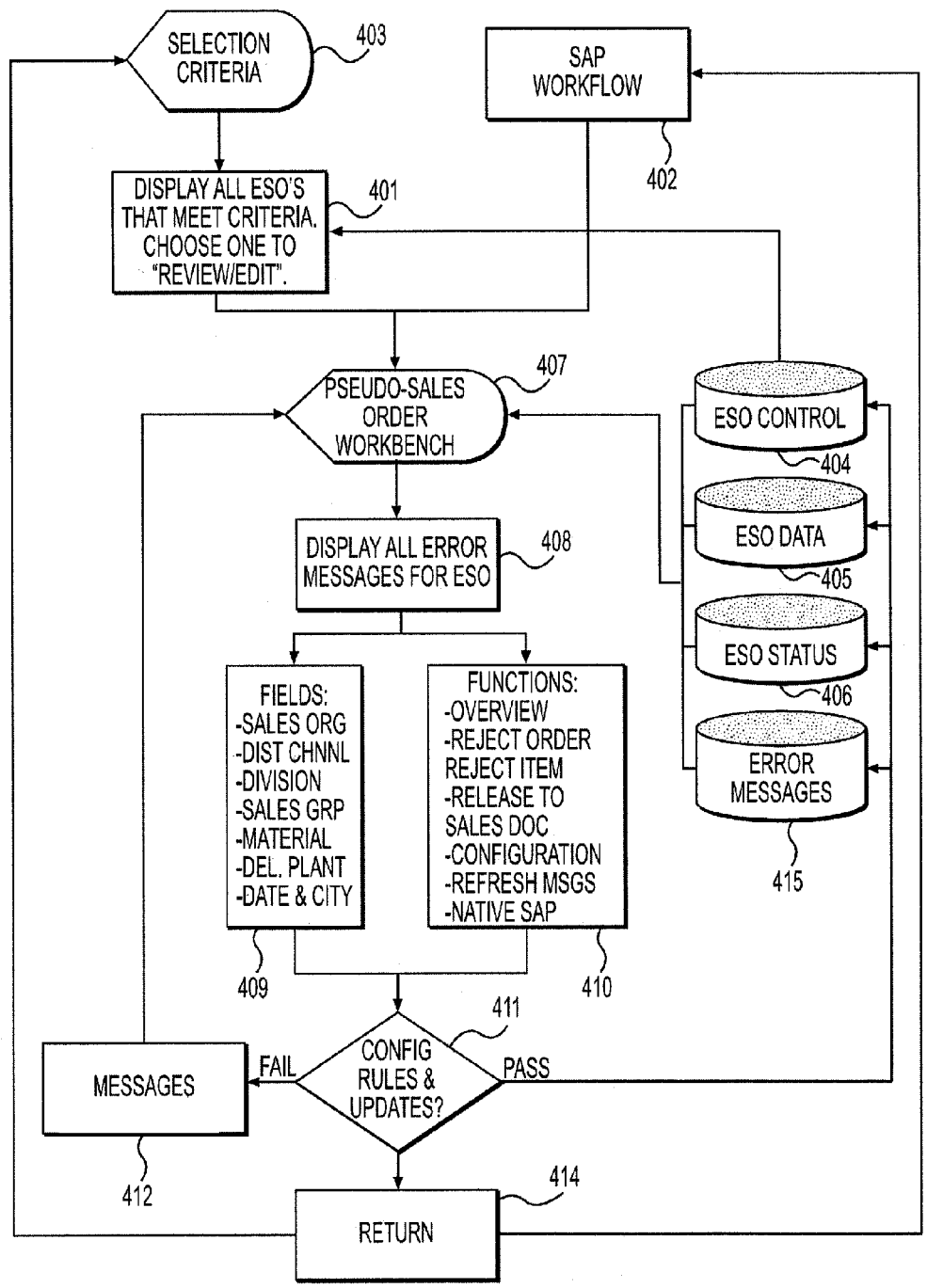
FIG. 4 is a flowchart illustrating the process of the pseudo-sales order workbench.

FIG. 4 shows a functional flow diagram of the pseudo-sales order workbench 206. When ESO errors are encountered, workflow items are created by the SAP Workflow, as indicated in function block 402. The workflow items are sent to the in-basket of the responsible person. When the work item is executed, as shown in function block 401, the work flow is displayed on a user terminal, as indicated by step 407. ESOs can also be displayed from the SAP workflow 402 that satisfy selection criteria that a user inputs into display block 403. Work flow messages are created under pre-defined defined conditions and routed to the responsible person for action. Responsible persons can view and execute their messages from their SAP Office Inbox (not shown). When the message is executed, the user is branched to the appropriate application to correct the condition. In a preferred embodiment of the present invention, a workflow message is created when the order interceptor 201 encounters an error or determines that a manual review of the ESO is required. The user can also input selection criteria via the input screen, as shown in step 403, to display ESOs that satisfy the selection criteria, as shown in function block 401. The ESOs are stored in accordance with the SAP AG Corp. ESO tables ESO Control 404, ESO Data 405, and ESO Status 406. These tables validate the ESO structure, and pass control to ALE where the ESO can be processed into the appropriate business object, such as a sales order or a purchase order acknowledgment, etc. The error message table 415 displays the error messages, as shown in function block 408. Once the error messages have been displayed, the user can also view the fields 409 associated with the ESOs on the pseudo-sales order workbench 206, as shown in function block 409. The user can also perform various operations on the ESO, as indicated in function block 410. A test is then made in decision block 411 to determine if the ESO complies with the configuration rules and updates. If the ESO does not satisfy the configuration rules, a message is sent to the Pseudo-sales Order Workbench, as shown in function block 412. If the ESO satisfies all configuration rules and updates, then the ESO is updated in tables 404, 405, 406 and 415. The process returns, as shown in function block 414. If the user specified selection criteria is via display 403, then the return is to the user's display terminal 403. If the SAP workflow 402 created the work item, then the return is back to SAP workflow 402.

Figure 5:
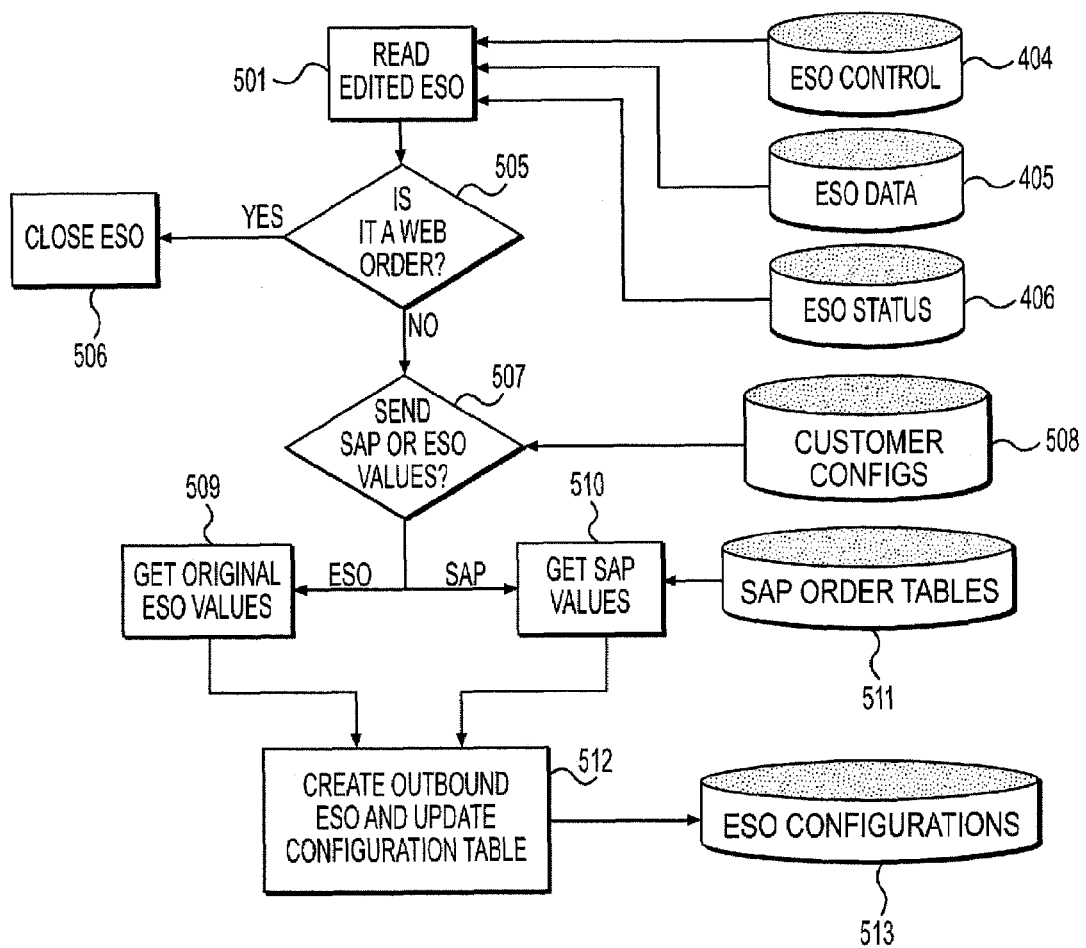
FIG. 5 is a flowchart of the reject acknowledgment process.

FIG. 5 is a flow diagram of the Reject Acknowledgment System 207. The reject acknowledgment process takes an ESO that was rejected in the order interceptor 201 and creates a corresponding outbound ESO containing the reject codes and appropriate values. The reject acknowledgment process can be used to reject incoming ESOs with types sales orders, sales order changes, or forecasts. An inbound ESO with one of these types can be rejected from the order interceptor 201 by entering a reject code for the ESO. As shown in function block 501, the rejected inbound ESO is read from the tables 404, 405, and 406. In decision block 505, the ESO is analyzed to determine if it was a web order. If yes, the ESO is closed, and no acknowledgment is sent, as indicated in function block 406. If decision block 505 determines that the order is not from the web, customer configuration table 508 is read to determine the customer configuration for responses. In decision block 507, a determination is made whether the customer has requested the acknowledgment to contain the values of the SAP order book, or the original values that the customer sent in for the ESO. If the customer has requested to have the original ESO values sent in the acknowledgment, the original values that the customer sent in for the ESO are read and used, as indicated in function block 509. If the customer has requested that the values from the SAP order book be sent in the acknowledgment, the SAP order tables 511 are read and these values are used, as indicated in function block 510. Once the appropriate data is obtained for the acknowledgment from either function block 509 or 510, the outbound ESO acknowledgment is created in block 512 using the reject codes from the rejected ESO, and the ESO configuration table 513 is updated with the acknowledgment ESO number. The reject acknowledgment system allows the response to the customer with the reason it was rejected without sending the customer's order request to the order processing system 209.

The following is a description of a preferred embodiment of the software modules used to implement the claimed invention. It will be apparent to those skilled in the art that the individual software modules could be designed and arranged so that they may individually provide different functionality, while the overall combination of software modules maintains the functionality recited in the claims.

Figure 6:
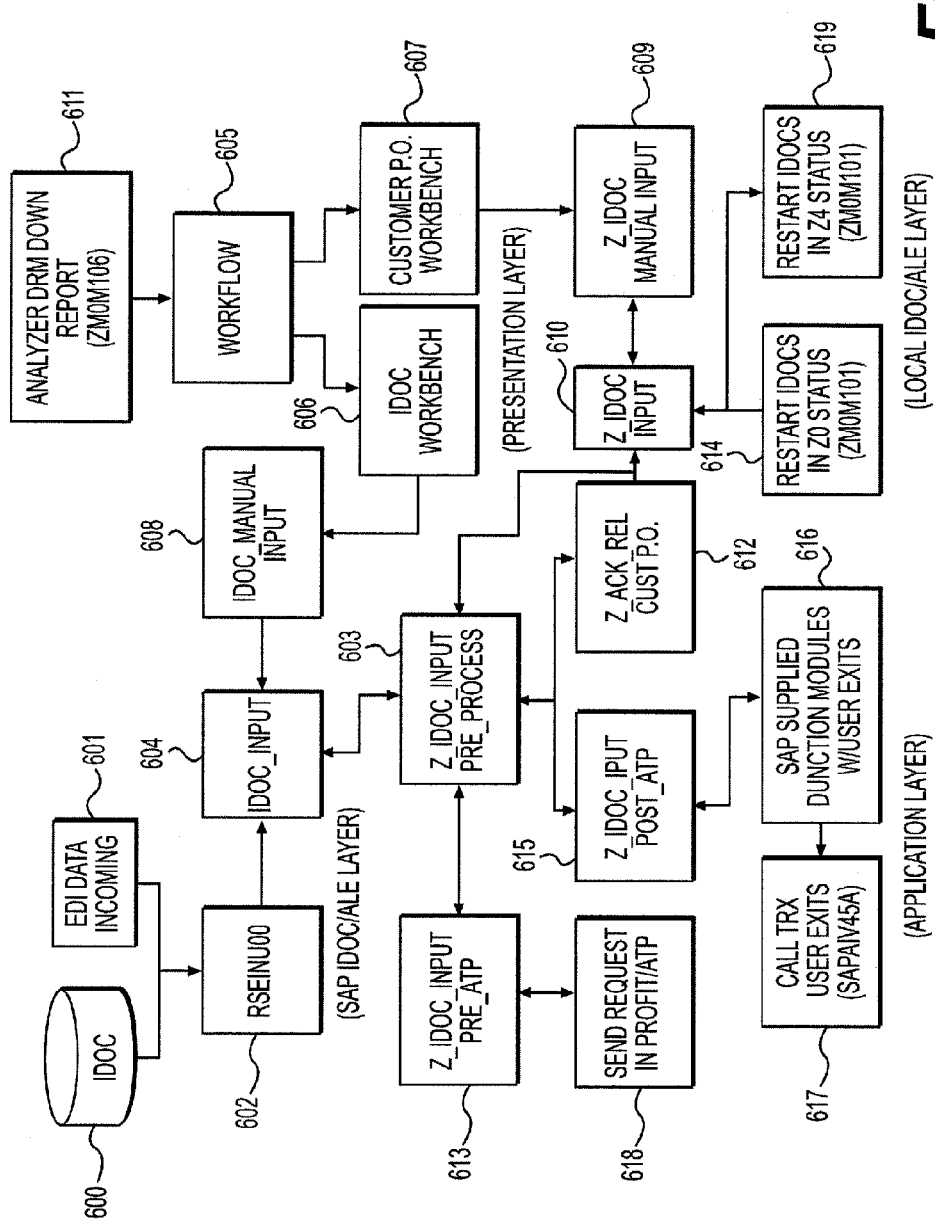
FIG. 6 is a block diagram showing a preferred embodiment of the relationship of the software modules that comprise the order information processing system.

A block diagram of how the software modules interface with each other is provided in FIG. 6. In general, inbound sales order requests that are to be fulfilled in SAP are routed as a flat file to the operating system where SAP is installed. The flat file representing the ESO is in SAP's published ORDERS02 ESO format for both new and change order requests and DELFOR01 for scheduling agreement forecasts and just in time deliveries. ORDERS02 and DELFOR01 formats consist of various data segments comprising the ESO. Example data segments in ORDERS02 are: E1EDK01 (header general data), E1EDK14 (header organization data), E1 EDP01 (item general data), and E1EDP20 (item schedule lines). Example data segments in DELFOR01 are: E1EDK09 (header data for JIT suppliers), E1EDP10 (item data for JIT suppliers), and E1EDP16 (item schedules for JIT suppliers. Typically, these requests originate from EDI, but they can originate from any external interface. The ESOs are a derivative of SAP's ESO ORDERS02 format for new and change orders and DELFOR01 for scheduling agreement forecast and Just In Time (JIT) releases.

The EDI_DATA_INCOMING module 601 is a standard SAP function module that initiates the processing of the flat file representing the ESO. The EDI_DATA_INCOMING module 601 calls the RSEINB00 module 602, passing the ESOs to be processed.

The RSEINB00 module 602 is the SAP Corp. standard program to process inbound ESOs irrespective of the application. Its main purpose is to load the file representation of an ESO into SAP ESO tables 404, 405 and 406, validate the ESO structure, and pass control to ALE where the ESO can be processed into the appropriate business object, such as a sales order or a purchase order acknowledgment, etc. If errors occur during the process, the RSEINB00 module 602 creates a workflow item which can be processed by an administrator using the standard ESO workbench module 606. ALE provides robust configuration support in determining how and when the ESO is processed. For inbound sales order requests, all customers will be configured to be routed through the pre-processor, Z_IDOC_INPUT_PRE_PROCESS module 603. This module is the first in a series of locally developed modules that perform the pre- and post-processing of an ESO prior to posting as a sales order. This processing supplements the SAP supplied function modules IDOC_INPUT_ORDERS/ORDCHG/DELINS (not shown) by manipulating the ESO before SAP's processes are called.

After the RSEINB00 module 602 validates and creates the ESO, control is passed to the IDOC_INPUT module 604, which is inside SAP's IDOC/ALE layer. Modules 600, 601, 602, 604 and 608 comprise the IDOC/ALE layer. Here, configuration tables are analyzed to determine how to process the inbound ESO. Again, for inbound sales order request, ALE will pass initial control to the pre-processor function module Z_IDOC_INPUT_PRE_PROCESS module 603 for local processing.

When ESO errors are encountered by the RSEINB00 module 602, workflow items are created by the workflow module 605 and sent to the in-basket of a responsible person. When the work item is executed, the IDOC Workbench module 606 generates a display on a user terminal. The EDI administrator can view the status of the ESO along with error text to determine the cause of error. The administrator can correct individual data segments of the ESO and initiate reprocessing of the ESO. The IDOC workbench module 606 enables an EDI administrator to manage raw data, but is not intended for a sales order entry person. One would have to know the relationship of the ESO segments as well as understand code qualifiers. For example, data segment E1EDP19, qualifier '001' represents customer material and qualifier '002' represents internal material. The IDOC Workbench module 606 is only intended to correct data errors that local processing does not handle. For example, a segment hierarchy error is detected before the pre-processor is called. All application related errors, such as duplicate PO number, will be handled in customer purchase order workbench module 607.

When work items related to IDOC workbench module 606 are executed, the IDOC_MANUAL_INPUT module 608 is called. This function module passes control to the IDOC workbench module 606 and awaits to process the results. If the return code indicates the ESO is to be processed, control is passed to the IDOC_INPUT module 604, and the appropriate application is called via ALE. If the ESO is processed successfully by the application, then the IDOC_MANUAL_INPUT module 608 updates the status of the work item to complete, indicating that it can be removed from the in-basket. If no action is taken from the IDOC Workbench module 606, the work item remains in the in-basket in an in-process status. If an error occurs during the application process, then the current work item is marked complete and a new work item is created in a ready status and displayed in the in-basket. This process is also used to model the Z_IDOC_MANUAL_INPUT module 609 and the Z_IDOC_INPUT module 610 used with local processing.

It should be noted that the following numbers correspond to the following activities cited hereafter in the specification:

850 - New Sales Orders
855 - Acknowledgment to sales order
860 - Change Order
865 - Acknowledgment to change order
830 - Forecast
870 - Response to Forecast
Z0- ESO Held for Order interceptor
Z1- ESO in Pre-Process Status
Z2- ESO Held for Pseudo-sales order Workbench
Z3- ESO Rejected in Pre-Processing
Z4- ESO in Pre-ATP status
Z6- ESO Closed Without Posting to Application
Z7- ESO Closed Without Posting and Routed to OEMLS For all inbound sales order requests, the IDOC/ALE layer will be configured to pass control to the local Z_IDOC_INPUT_PRE_PROCESS module 603. For now, the pre-processor module 603 will support requests using ORDERS02 and DELINS ESO format. Currently, this includes 850/862 new order requests, 860 change order requests and 830/E forecast and JIT scheduling releases. 850 also includes create contract and create with reference to a contract.

The Z_IDOC_INPUT_PRE_PROCESS module 603 is where local pre-order processing occurs that is not supported by standard SAP. The data in the ESO is audited above standard SAP edits and audits. In addition, conversions unique to particular users will be performed. Fields such as sales area and delivering plant are derived and added back to the inbound ESO. Fields such as order quantity and ship date may be altered based upon local business rules such as, for example: (i) round the order quantity up to the minimum order quantity defined in the materials sales view, or (ii) offset the request date with the transit time. All these conversions occur prior to the request being routed to the PROFIT/ATP module 618.

If the ESO is incomplete, in error, or requires manual review, then the Z_IDOC_INPUT_PRE_PROCESS module 603 creates a workflow item 605 that can be executed from the in-basket of the responsible person to review and modify the request by using the customer purchase order workbench 607. If the ESO is rejected, then an acknowledgment is generated back to the customer without posting the document to the application. The ESO's status is set to Z3. If the ESO is marked complete, then the ESO's status is set to Z6 and not posted to the application. Likewise, if the ESO is rerouted to OEMLS (211), then the ESO's status is set to Z7 and not posted to the application. Otherwise, if the ESO is complete and accepted by the User, the request is first routed to module 613 if one or more materials on the ESO is on the PROFIT/ATP module 618, and then to the post-ATP module 615 to post the document.

The User can access ESOs held by the pre-processor 603 by executing work items in their Office inbox or by using the "Analyzer" drill-down report module 611 (trx ZEDU). This module provides a front-end to the inbox process that allows search parameters, such as delivery plant document type, and ESO status and displays the ESOs in report format with drill-down and mass processing capabilities. From the list, the User can branch to customer purchase order workbench module 607, existing sales order transactions, or to the native IDOC workbench module 606. The report gives a visual representation of the ESO's status by using traffic light icons and can display why the ESO was held by the pre-processor module 603. This can help the user prioritize which ESOs to process first and so on. In addition, the report can also be used to compare data on the ESO to data on the existing sales order for change type of requests.

If pre-processor module 603 detects an error or manual review condition, the workflow module 605 creates a workflow that is made available to the in-basket of the responsible person. Once the work item is executed, the customer purchase order workbench module 607 provides a display to a user terminal. The user interface is modeled after the incompletion log for processing sales orders. The initial screen will display a list of messages identifying why the request was held along with key information from the ESO's control and data record segments. If the user is authorized, each item in the list can be executed and taken to the appropriate screen to correct or review the data. After each correction, the ESO is reprocessed by pre-processor module 603. After executing the message, control goes back to the main screen. Messages will be removed from the list if it now passes all the edits and audits for that rule. If the request was held for manual review, the User can navigate to an overview screen to review the request using screens similar to those in SAP sales order process. There, certain fields can be updated, such as sales area and delivery plant. Some fields however, can only be changed in conjunction with executing specific messages. For example, the customer's PO number can be changed only if a duplicate error is detected. For 860 change order requests, the corresponding sales order information can be displayed to assist the user in analysis by drilling down on the order number field. Additionally, a branch to the native SAP IDOC Workbench can be made by drilling down on the ESO number, as provided by the analyzer drill down report module 611. Access is now available to all ESO segments and data that may not have been available in customer purchase order workbench module 607.

To reject all or part of the request, the user must provide a reject reason code at either the header or line level. A configuration table will be checked by customer and transaction code to see if partial rejects are allowed. If all line items are rejected, or the header is rejected, then an 855/865 acknowledgment is generated once the request is released from the customer PO workbench module 607. In this case, the request is never posted to the sales order system. For 850 new orders, if any of the line items are accepted, then the entire order is loaded into SAP with rejected line items flagged as rejected with the appropriate reason code. The acknowledgment will be sent as part of the sales order post process. For 860 change orders, only the line items accepted are passed to the SAP sales order process. All rejected line items along with their reject codes are stored for subsequent processing. After the sales order change is posted, the acknowledgment process will pick up those lines rejected in workbench module 606 and merge them along with the accepted line items on the sales order and create one acknowledgment for the order. Once the user releases the request, the order is routed back to pre-processor module 603, and if no error or review conditions are detected, the request routed to ATP module 618, and finally to the SAP supplied function modules 616 and 617 to post the order.

If the user rejects the customer's request in the customer purchase order workbench module 607, then the appropriate outbound ESO acknowledgment (855/865/870) is generated automatically by the Z_ACK_REJ_CUST_PO module 612. The ESO can be rejected at either the header level or by rejecting all line items on the ESO. Rejected ESOs never get posted to the sales order application. The ESO's status is set to Z3. Module 612 supports two methods of acknowledging rejects back to the customer based upon customer configuration table 508. If the value is 'A' or blank, then the acknowledgment is built from the original ESO with the appropriate reject code. If the value is 'C', for new order requests, the acknowledgment is built from the original ESO without a reject code. For change order requests, the acknowledgment is built using the existing sales order without a reject code.

When work items related to the customer purchase order workbench are executed, the Z_IDOC_MANUAL_INPUT module 609 is called. This module passes control to the customer purchase order workbench module 607, and awaits to process the results. If the return code indicates the ESO is to be processed, control is passed to the Z_IDOC_INPUT module 610 which calls the pre-processor in this case. If the ESO is processed successfully by the application, then the Z_IDOC_MANUAL_INPUT module 609 updates the status of the work item to complete indicating that it can be removed from the in-basket. If no action is taken from the customer purchase order workbench module 607, the work item remains in the in-basket in an in-process status. If an error occurs during the application process, then the current work item is marked complete and a new work item is created in a ready status and displayed in the in-basket.

After the inbound request has successfully cleared the Z_IDOC_INPUT_PRE_PROCESS module 603 and customer PO workbench module 607, and if one or materials on the ESO is on the PROFIT/ATP module 618, the Z_IDOC_INPUT_PRE_ATP module 613 is called. Here, the PROFIT/ATP interface file ZATPDEM is used as the communication vehicle between SAP and the third party ATP system. For example, for IBM Corp., the third party ATP system is PROFIT/ATP. The file is managed by PROFIT/ATP module 618. The rules for managing entries in the PROFIT/ATP interface file are the same rules used in the SAPMV45A module 617. The "save document" user exit was changed to apply the PROFIT/ATP results to the sales order. For requests already committed by the PROFIT/ATP module 618 (requests from 9BD), a dummy reservation is created to bypass the PROFIT/ATP module 618. In this case, the request is considered complete by the PROFIT/ATP module 618 and no response back is required. In this case, control returns back to pre-processor module 603, which directly initiates post-atp processing 615. Requests requiring PROFIT/ATP module 618 action are added to the interface table and are sent to the PROFIT/ATP module 618. If the link is active and responding in a timely fashion, then control returns back to pre-processor module 603 which directly initiates post-atp processing at module 615. If the link is not responding, then pre-processor module 603 reinitiates module 613 in a mode to indicate that the response is no longer synchronous and to trigger the ZMOM103 module 619 after responding. The restart ESOs in Z4 status (ZMOM103) module 619 restarts the ESO process at the post-atp step.

The module Z_FORMAT_ATP_DATA (not shown) is used to encapsulate the interface from SAP to PROFIT. The module interfaces entries in table ZATPDEM to the PROFIT/ATP module 618 via module Z_PROFIT_DATA_EXTRACT (not shown).

The module Z_PROFIT_DATA_EXTRACT (not shown) is a remote function used to pass reservation request from SAP to the PROFIT/ATP module 618. The use of MQSeries is transparent to the application.

The PROFIT/ATP module 618 services the request made by the Z_PROFIT_DATA_EXTRACT module (not shown). The PROFIT/ATP module 618 communicates its response by calling remote function call Z_PROFIT_DATA_LOAD (not shown). Module Z_PROFIT_DATA_LOAD (not shown) is called remotely from the PROFIT/ATP module 618 to update commit data for reservations in table ZATPDEM. This table is then used to communicate the commit data to SAP sales order processes. After the interface table is are updated, event Z_EDI_ATP_START (not shown) is started if the request to PROFIT/ATP module 618 can not be performed in a synchronous mode, such as when the link is down or slow in responding. This event starts ZMOM103 619 which restarts the process.

If the Z_IDCO_INPUT_PRE_PROCESS module 603 determines that a previous request for a customer and given purchase order is pending an acknowledgment, then the inbound ESO's status will be set to 'Queued for Pre-Processor' (Z0). The definition of incomplete in this case means that a prior ESO has not been posted by the sales order application or the original sales order is incomplete or blocked for any reason. This feature can be disabled by changing the corresponding column in table 508 using trx ZEDI. The ZMOM101 module 614 will be scheduled as a reoccurring job run hourly to process ESOs in this status. Each request will be checked for pending acknowledgments. If the request is cleared for process, then control is passed to the Z_IDOC-INPUT module 610 which calls the pre-processor and manages the ESO's status and work item; otherwise, the request is held until the next run of the ZMOM101 module 614.

If one or more materials contained in the ESO are on the PROFIT/ATP module 618, then the ESO must be routed through module 613 from the pre-processor module 603. If the link is down or slow in responding, then the ESO status is set to Z4 to indicate awaiting response from the PROFIT/ATP module 618. Processing on the ESO is halted until all responses are received from the PROFIT/ATP module 618. The response function module triggers the event Z_EDI_ATP_START (not shown), which starts the ZMOM103 module 619. The ZMOM103 module 619 selects all ESOs in status Z4 and analyzes the interface table to see if all schedules on the ESO have responses (0 commit is considered a valid response). If the request has all the responses, then control is passed to the Z_IDOC_INPUT module 610, which calls the post-ATP module 615 to post the ESO to the application. Otherwise, the ESO remains in a Z4 status until the next triggering of the ZMOM103 module 619.

If processing of the ESO is suspended and a workflow item is not created, then the Z_IDOC_INPUT module 610 is used to restart the process. This module along with Z_IDOC_MANUAL_INPUT module 609 which is used in conjunction with workflow module 605, is the local IDOC/ALE layer which mimics the corresponding modules in SAP. ESOs are currently suspended in 2 cases: 1) if an 860 change order can not be processed because a prior ESO is pending or the order is blocked, then the status is Z0; 2) if the link to the PROFIT/ATP module 618 is not responding in a timely fashion, then the status is set to Z4. The ZMOM101 614 and ZMOM103 619 modules use the PROFIT/ATP module 618 to restart the ESO processing by calling the appropriate function module based upon the status of the ESO. For example, the post-ATP module 615 is called if the ESO is in Z4 status, and the pre-processor module 603 is called if the ESO is in Z0. This function module is also responsible for creating workflow items and managing the ESO's status based upon results from the application function module.

The Z_IDOC_INPUT_POST_ATP module 615 performs four major functions: 1) applies the commit information from the PROFIT/ATP module 618 back onto the ESO if one or more materials represented in the ESO are on the PROFIT/ATP module 618; 2) holds the ESO for manual review if key data changes from the PROFIT/ATP module 618, such as the delivery plant and to split the ESO into multiple ESOs for new order requests if there are multiple line items on the ESO supplied by more than one delivery plant; 3) calls the appropriate SAP supplied function module to post the document (new and change orders, contracts, reference to contracts, and scheduling agreement releases), and 4) performs post processing logic based upon the results from the application function module, such as to create specialized work items if the call transaction fails, general cleanup etc.

SAP supplies function modules IDOC_INPUT_ORDERS (not shown) to post new sales orders, IDOC_INPUT_ORDCHG (not shown) to change existing sales order, and IDOC_INPUT_DELINS (not shown) to add FDS and JIT scheduling releases. User exits are available at key points in the process to allow local modifications as necessary. Several of the user exits are enabled to load additional data into the BDC session, such as delivery plant, delivery block, and fixed quantity indicator. For delivery schedules, IDOC_INPUT_DELINS (not shown) supports customer expected pricing condition EDI 1 with screen logic. No edits and audits are performed in these exits. These types of functions are performed by the pre-processor module 613 and worked in the workbench module 607 before this stage.

Function modules Z_IDOC_INPUT_CONTRACT 616 and Z_IDOC_INPUT_REF_CONTRACT 616 create contracts and create an order with reference to the contract, respectively. Both modules are derivatives of IDOC_INPUT_ORDERS 616 and still share the same user exits. Additional logic was added to support the required fields and screen flows.

The SAP Supplied Function Modules with User Exits module 616 functions with SAP function modules IDOC_INPUT_ORDERS 616 to post new sales orders, ICOC_INPUT_ORDCHG 616 to change existing sales orders, and IDOC_INPUT_DELINS 616 to add FDS and JIT scheduling releases. User exits are available at key points in the process to allow local modifications as necessary. Module 616 enables additional data, such as delivery plant, delivery block, fixed quantity ind., additional partners, and pricing reference material to be loaded into the BDC session. For delivery schedules, IDOC_INPUT_DELINS (not shown) supports customer expected pricing condition EDI1 with screen logic. No edits and audits are performed in these exits. These types of functions are performed by pre-processor module 603 and worked in workbench module 606 before this stage.

SAP supplies the Call Trx User Exits (SAPMV45A) module 617 to manage the sales order entry set of transactions, such as create, change and display sales orders, contracts, and scheduling agreements. User exits are also available at key processing points to address local processing requirements. Exits were modified to support our unique ATP Requirements.

The following is a description of how the Order Interceptor Rules function.

ESO Audits and Adjustments

The following audits and adjustments are performed on the ESO provided the preconditions are satisfied. If an audit fails or manual review is required, then the ESO is held for correction/review in the customer PO workbench module 607. The condition must be corrected or marked reviewed in the customer PO workbench module 607 before the ESO can be released to the application for processing. Any time data is changed in the customer PO workbench module 607, order interceptor module 603 reapplies the audits. This cycle continues until all messages are corrected or marked reviewed.

All these events occur after the ESO is created on the system and prior to the ESO posting to the application.

These audits apply to all ESO types supported by the order interceptor 603. At the present, this includes ZORDERS2 for requests processed using VA01, VA02, and VA41 (Sales Orders and Contracts) transactions and ZDELFOR2 for requests processed using transaction VA32 (Scheduling Agreements).

Validate Logical Message Type

Preconditions

Audits The following logical message types are supported by the Order interceptor:

| ORDERS | New Order |
|---|---|
| ORDCHG | Change Order |
| DELINS | Scheduling Agreement |

Pseudo-Sales Order Workbench Message

Message ZV 327. Logical message type & and message code & not supported by the Order interceptor. The ESO must be marked complete in the Workbench and can not be posted to the application.

Validate Entry in Local EDI Configuration Table

Preconditions

None

Audits

An entry must exist in the table 508 for the given Customer, the ESO's logical message type (edidc-mestyp) and message code (edidc-mescod).

Pseudo-Sales Order Workbench Message

Message ZV 222. ZEDITCFG not configured for customer &, logical message type &, and message code &. The corresponding entry in ZEDITCFG must be made using trx ZEDI.→Configuration→By Customer/Msg/Material before the ESO can be released from the Workbench.

Validate E1EDS01 Summary Total Segments

Preconditions

Audit is performed if E1EDS01 is provided on the ESO.

Audits Verify the following summary segments (E1EDS01-SUMID and SUMME) provided on the ESO from the EDI Translator match the totals computed by the Order interceptor:

| 001 | Total number of line items on the ESO |
|---|---|
| 004 | Total requested quantity from delivery schedule segment on the ESO |
| Z01 | Total number of segments on the ESO not including summary segments |

Pseudo-Sales Order Workbench Message

Message ZV 357. Order interceptor detected summary level totals mismatch. The ESO must be marked complete in the Workbench and can not be posted to the application.

Validate External Partner Entries Using EDPAR

Preconditions

Audit is performed if E1EDKAI or E1EDPAI is provided on the ESO without field PARTN (LIFNR).

Audits

The following header level partner functions (E1EDKAI-LIFNR) are cross referenced using EDPAR table to determine the SAP internal customer number:

| AG | Sold-To |
|---|---|
| LF | Supplier |
| AB | Unloading Point |
| WE | Ship-To |
| SP | Carrier |
| RE | Bill-To |
| RG | Payer |

The following item level partner functions (E1EDPA1-LIFNR) are cross referenced using SAP's EDPAR table to determine the SAP internal customer number:

| WE | Ship-To |
|---|---|
| RE | Bill-To |
| RG | Payer |

Pseudo-Sales Order Workbench Message

Message ZV 226. External partner number & invalid for partner function &. The corresponding entry in EDPAR must be made using trx VOED→Partner→Application→Conversion or changing the corresponding LIFNR field on the ESO to match EDPAR. The message must be corrected before the ESO can be released from the Workbench.

Find Existing Sales Order

Preconditions

Logical message type ORDCHG.

The following fields must exist in the ESO:
Customer's PO (VBAP-BSTNK)
Default Order Type (VBAP-AUART)

Audits

Possible candidates are selected from view M_VMVAA using the Customer's Sold-to, PO number, and default order type. If no entries are found, or more than 1 entry found, the ESO is held for the Pseudo-Sales Order Workbench.

Pseudo-Sales Order Workbench Message

Message ZV 242. Existing sales order not found for customer &, PO number &, and line &. From the Overview menu, correct the customer's PO number.

Message ZV 299. Multiple sales orders exist for customer's PO & and line &. Process the error message and choose the appropriate sales order for processing.

The matching sales order must be determined before the ESO can be released from the Workbench.

Split Change ESO into Multiple ESOs

Preconditions

The ESO is split under the following conditions:
Logical message type ORDCHG
Multiple line items on the ESO Customer's PO and line item are found on separate discrete sales orders Audits For each line item on the ESO, the corresponding sales order is found using the Customer's PO and line item (VBAP-POSEX). If the line items span multiple sale orders, then the ESO is split into multiple ESOs, one per sales order. For example, if line items 1, 3, 4 were found on sales order 0090016323, line items 2,6 were found on 0090016524, and line item 5 was found on 0090016535, then 3 ESOs would be created. ESO A would contain line items 1, 3, 4. ESO B would contain line items 2, 6. ESO C would contain line item 5. Each new ESO inherits all the header level segments from the original ESO such as partner functions and reference data. The original ESO is marked complete (status Z6-Closed without Posting to Application) after all the ESOs are created successfully. From then on, the new ESOs are processed independently from one another. In this example, ESO A could be posted successfully where as ESO B and C be held for manual review.

Pseudo-Sales Order Workbench Message See Find Existing Sales Order.

This is covered under the Find Existing Sales Order Module.

Find Existing Scheduling Agreement

Preconditions

Logical message type DELINS

The following fields must exist in the ESO:
Customer's material number (VBAP-KDMAT)
Optionally, Customer's PO (VBAK-BSTNK)

Audits

Possible candidates are selected from view M_VLPMA using the following selection criteria:

| | |
|---|---|
| KDMAT | Customer's material number |
| KUNNR | Sold-to |
| KNREF | Customer's description of partner (plant, storage location) |
| ABLAD | Wildcard + Unloading Point |
| ABRVW | Wildcard + delivery schedule usage ID |
| KTEXT | Wildcard + search term for product proposal |
| BSTNK | Optionally configured to use Customer PO number (T663 A-BSTNKP) |

If no entries are found, or more than 1 entry found, the ESO is held for the Pseudo-Sales Order Workbench.

Pseudo-Sales Order Workbench Message

Message ZV 328. T661W not configured for vendor &, plant &, and unloading point &. Process the error message (link to trx OVA1) and make the appropriate entry so that the internal Sold-to can be determined.

Message ZV 329. T663A not configured for sold-to & and unloading point &. Process the error message (link to trx OVA9) and configure the rules for sold-to and unloading point.

Message ZV 330. No scheduling agreement could be found. Process the error message and change the selection criteria so that the appropriate scheduling agreement can be chosen.

Message ZV 331. No scheduling agreement could be found using customer's PO number. Process the error message and change the selection criteria so that the appropriate scheduling agreement can be chosen. This includes the customer's PO number.

Message ZV 332. No unique scheduling agreement could be determined. Process the error message and select the appropriate scheduling agreement from the list.

Message ZV 334. No unique scheduling agreement could be found using customer's PO. Process the error message and choose the appropriate scheduling agreement from the list.

Message ZV 361. Scheduling agreement contains multiple lines for the same customer's material number. Process the error message and choose the appropriate line item.

Message ZV 363. The Ship-to on ESO does not match the Ship-to on the scheduling agreement. Process the error message and change the Ship-to on the ESO.

The matching scheduling agreement and line item must be determined before the ESO can be released from the Workbench.

Required Segments in ESO (ORDERS and ORDCHG)

Preconditions

Audit is Performed for ORDERS and ORDCHG Logical Messages.

Audits

The following ESO segments are required:

| | |
|---|---|
| E1EDKA1 | Order Header |
| E1EDP01 | Line Item (One or more) |

Pseudo-Sales Order Workbench Message

Message ZV 213. Required segment & not found in ESO. The ESO must be marked complete in the Workbench and can not be posted to the application.

Required Segments in ESO (DELINS)

Preconditions Audit is performed for DELINS logical message. Audits The following ESO segments are required:

| | |
|---|---|
| E1EDK09 | Release Header |
| E1EDP10 | Line Item (One per ESO) |
| E1EDP16 | ScheduleJIT/FDS Line |

Pseudo-Sales Order Workbench Message

Message ZV 213. Required segment & not found in ESO. The ESO must be marked complete in the Workbench and can not be posted to the application.

Required Fields in ESO (ORDERS and ORDCHG)

Preconditions

Audit is Performed for ORDERS and ORDCHG Logical Messages.

Audits

The following ESO fields are required:

| Description | Segment | Field | Notes assigned from |
|---|---|---|---|
| Customer No | E1EDKA1 | parvw = 'AG' partn (converted from lifnr using EDPAR) | if not provided, assigned from edidc-sndprn |

-continued

| Description | Segment | Field | Notes assigned from |
|---|---|---|---|
| Customer's PO No | E1EDK02 | qual = '001' belnr | |
| Customer's Line No | E1EDP01 | posex | |

| Description | Segment | Field | Notes assigned from |
|---|---|---|---|
| Customer's Material | E1EDP19 | qualf = '001' if configured for customer's material; qualf = '005' if configured for IBM catalog number | required if internal material not provided qualf = '002' |

Pseudo-Sales Order Workbench Message

Message ZV 244. Required field & not supplied in ESO. The ESO must be marked complete in the Workbench and can not be posted to the application.

Message ZV 340. Determining material (&) not supplied in ESO. The ESO must be marked complete in the Workbench and can not be posted to the application. Optionally, check to see if the local configuration is correct in ZEDITCFG for this customer and transaction.

Required Fields in ESO (DELINS)

Preconditions

Audit is performed for DELINS logical message.

Audits

The following ESO fields are required:

| Description | Segment | Field | Notes |
|---|---|---|---|
| Customer No | E1EDKAI | parvw = 'AG' partn (converted from lifnr using EDPAR) | if not provided, assigned from cdidc-sndprn |
| JIT/FDS Indicator | E1EDP10 | screl | |
| Customer's Material | E1EDP10 | idnkd | required if internal material not provided idnlf |

Pseudo-Sales Order Workbench Message

Message ZV 244. Required field & not supplied in ESO. The ESO must be marked complete in the Workbench and can not be posted to the application.

Unique Tracking Number per ESO

Preconditions

Audit is performed if tracking number is provided in ESO.

Audits

The tracking number is generated from the EDI Translator in E1EDK02-BELNR and QUALF 'Z02' for tracking purposes across the various systems. The tracking number must be unique per ESO. The tracking number is stored in ZEDI-ACKR-TRACKNO and can be up to 35 characters in length.

Pseudo-Sales Order Workbench Message

Message ZV 368. Tracking number already assigned to ESO. The ESO must be marked complete in the Workbench and can not be posted to the application.

Revision Number in Sequence

Preconditions Audit is Performed Under the Following Conditions:
    Revision number provided in the ESO
    Logical message ORDCHG
    Local EDI configuration set to process changes in sequence (ZEDITCFG-ZACKPEND)
    Customer's PO number provided
    Existing Sales Order determined Audits The revision number is provided from the EDI Translator in E1DK02-BELNR and QUALF 'Z01'. Its purpose is to facilitate processing changes from customers in sequence for those customers requiring this feature. The initial offering only checks that the revision number is greater than the last revision number processed for this sales document. The audit will be more robust as we understand our trading partner's requirements. The revision number is stored in ZEDIACKR-REVISION and can be up to 35 characters in length.

Pseudo-Sales Order Workbench Message

Message ZV 358. Change revision level is out of sequence. The ESO must be marked complete in the Workbench and can not be posted to the application.

Determine Order Type

Preconditions Order type is determined under the following conditions:
    For logical message ORDERS when segment E1EDK14, qualf'012', field ORGID is NOT provided on the ESO
    For logical message ORDCHG and DELINS, the existing sales document found Audits For new sales order requests, the order type is determined based upon the ESO's logical message type (edidc-mestyp) and message code (edidc-mescod). If the message type is ORDERS and message code not equal to BPO (for blanket PO), then the order type is defaulted to 'OR' for standard order. If the message type is ORDERS and message code is BPO, then order type is defaulted to 'ZBO' for contract. After the internal material is determined, the default order type can be overridden from the local EDI Configuration table/field ZEDITCFG-ZOVRAUART (rule is only applicable at material level).

For changes to an existing sales document, the order type is taken from the existing document. For example, a change to an existing standard order would be 'OR' or a change to a scheduling agreement (new release) would be 'LZ' and so on.

Pseudo-Sales Order Workbench Message

None

Determine Sales Area

Preconditions
    The Sales area is determined under the following conditions:

For logical message ORDERS when the following segments are NOT provided on the ESO (segment E1EDK14, QUALF xxx, field ORGID) Sales Org QUALF '008'
Distribution Channel QUALF '007'
Division QUALF '006'
For logical message ORDCHG and DELINS, the existing sales document found Audits For new sales order requests, the Sales area is determined from table EDSDC. The keys to this table are KUNNR (Customer number) and LIFNR (Vendor number sent with EDI). The Customer number is the Sold-to number and the Vendor number represents our Sold-to number at the Vendor. LIFNR is taken from the LF partner (E1EDKAI-PARTN) field on the ESO. If this field is not provided, the LIFNR is taken from the AG partner (E1EDKAI-LIFNR) field on the ESO. Together, these fields determine the Sales Area. For changes to an existing sales document, the Sales area is taken from the existing document.

Pseudo-Sales Order Workbench Message

Message ZV 233. Default sales area could not be determined for Customer & and Vendor &. Process the error message and make the corresponding entry in EDSDC using trx VOED→Partner→Application→Customer/Supplier or from the Overview Menu, choose Header→Partner and change the corresponding LIFNR field on the ESO to match EDSDC. The message must be corrected before the ESO can be released from the Workbench.

Determine Internal Material

Preconditions The internal material number is determined under the following conditions:
   Internal material number NOT provided and local EDI configuration ZEDITCFG-ZEDIMATNRF='R' for redetermine material
   Customer's material number provided
   Sales area determined For logical message ORDCHG, the sales order must exist (using Customer's PO number). For DELINS (Scheduling Agreements), both the Scheduling Agreement and line item must be determined.

Audits

For a new sale order request, or change to an existing order (line item add or change where the Customer's material number does not match the Customer's material number on the corresponding line item (using Customer's line number), the internal material is determined from the Customer Info Record using SAP supplied function module RV_CUSTOMER_MATERIAL_READ.

For change to an existing sales document where the Customer's material number does not change, the internal material is taken from the matching line item on the order.

Pseudo-Sales Order Workbench Message

Message ZV 289. Customer provided IBM material & on line &. Manual review required.

Determine Delivering Plant

Preconditions The delivering plant is determined under the following conditions:
   Delivering plant NOT provided
   Internal material determined
   Sales area determined For logical message ORDCHG, the sales order must exist (using Customer's PO number). For DELINS (Scheduling Agreements), both the Scheduling Agreement and line item must be determined.

Audits

For a new sale order request, or change to an existing order (line item add or change where the Customer's material number does not match the Customer's material number on the corresponding line item (using Customer's line number)), the delivering plant is determined from the material's sales view (table MVECE, field DWERK). For change to an existing sales document where the Customer's material number does not change, the internal material is taken from the matching line item in the order.

Pseudo-Sales Order Workbench Message

Message ZV 229. Sales view for material & not found. Process the error message and change the Sales area or internal material so that the sales view for the material exists. The message must be corrected before the ESO can be released from the Workbench.

Duplicate Sales Order by Line Item and Material

Preconditions Audit is performed under the following conditions:
   Logical message ORDERS
   Customer's PO number provided
   Customer's line item provided
   Local EDI configuration set to check for duplicate order (ZEDITCFG-ZEDIBSTNK)
   Internal material number determined Audits Existing sales orders are selected from view M_VMVAA using the Customer's Sold-to, PO number, and default order type. For each entry in the view, the corresponding line items are selected from VBAP. Each line item on the ESO is then compared to the entries from VBAP. If a match is found, then the ESO is held for the Pseudo-Sales Order Workbench.

Pseudo-Sales Order Workbench Message

Message ZV 243. Duplicate sales order for customer's PO &, line &, and material. From the Overview Menu, change the customer's PO, line, or material if this is not a duplicate request; otherwise, reject the customer's request.

Validate Line Item and Action Code in Context with Request

Preconditions

Audit is performed under the following conditions:
   Customer's line item provided
   Internal material number determined for logical message ORDCHG and DELINS
   Existing sales order found for logical message ORDCHG and DELINS Audits Each line item on the ESO must be unique. In addition, the following matrix is used to validate the action code in context with the Customer's request:

| Logical Message | Line Item Action Code Domains | Audit |
|---|---|---|
| ORDERS | '001' - Add | See Duplicate Sales Order |

-continued

| Logical Message | Line Item Action Code Domains | Audit |
|---|---|---|
| ORDCHG and DELINS | '001' - Add '002' - Change '003' - Delete | '001' - Line item and internal material must not exist on sales order '002' - Line item and internal material must exist on sales order '003' - Line item and internal material must exist on sales order |

If any of the audits fail or if a line item '003' delete is requested, then the ESO is held for the Pseudo-Sales Order Workbench Pseudo-Sales Order Workbench Message Message ZV 247. Customer's line & not unique on request. Process the error message and change the customer's line item to be unique on the ESO if approved by customer; otherwise, reject the customer's request.

Message ZV 246. Customer's line & and action code & not valid for an existing order. Process the error message and change the action code to a valid domain.

Message ZV 245. Customer's line & and action code & not valid for a new sales order. Process the error message and change the action code to '001' or reject the customer's request.

Message ZV 275. Customer's line & and action code & inconsistent for an existing sales order. Process the error message and change the line item or action code to be consistent or reject the customer's request.

Message ZV 283. Customer has requested to delete line &. Manual review required.

Verify that Ship-to is Provided on New Sales Order Request

Preconditions Audit is performed under the following conditions:
  Logical message ORDERS
  Request is NOT a reference to a contract (reference to contract provided in E1EDK02 '005' or '006' qualifier, field BELNR)

Audits

Ship-to party must be provided by the Customer at the header level. The header level partner is found in ESO segment E1EDKA2, PARVW='WE' in field PARTN or LIFNR. If the Ship-to is not provided, then the ESO is held for the Pseudo-Sales Order Workbench.

Pseudo-Sales Order Workbench Message

Message ZV 226. External partner number & not valid for partner function &. Process the error message and choose from the list of EDPAR entries or fastpath to EDPAR maintenance (trx VOED→Partner→Application→Conversion. The Ship-to must be provided before the ESO can be released from the Workbench.

Verify ESO in Context as a Sales Document

Preconditions

Audit is performed under the following conditions:
  Sales Area determined
  Internal material determined
  Delivery plant determined Audits This audit ensures that the combination of key data elements are valid for this request. The following audits of this nature are performed:
  Valid Sales Area (VBAP-VKORG, VTWEG, SPART) exists in TVTA
  Valid Sales Area by Customer (VBAP-VKORG, TVTA-VTWEG, SPART) exists in KNVV
  Internal material exist in material master MARA and not flagged for deletion
  Internal material exist in sales view MVKE and not flagged for deletion
  Check for Restricted Material using SAP's supplied function RV_Material_Status_Check
  Check for Excluded/Listed Material using SAP's supplied function 'Product_List_Exclusion'
  Valid delivering plant for Sales Area (VBAP-VKORG, VTWEG) exists in TVKWZ
  Internal material exist in delivering plant MARC and not flagged for deletion Pseudo-Sales Order Workbench Message Message ZV 227. Invalid Sales Area & & &. Process the error message and enter a valid Sales Area. The Sales Area must be valid before the ESO can be released from the Workbench.

Message ZV 378. Sales Area & & & not defined for customer &. Process the error message and enter a valid Sales Area for customer. The Sales Area must be corrected before the ESO can be released from the Workbench.

Message ZV 234. Material & not found for flagged for deletion. Process the error message and change the material or reject the customer's request.

Message ZV 235. Material & is restricted for use. Process the error message and change the material or reject the customer's request.

Message ZV 288. Material & has been excluded. Process the error message and change the material or reject the customer's request.

Message ZV 289. Material & is not listed and therefore, not allowed. Process the error message and change the material or reject the customer's request.

Message ZV 231. Delivering plant & not valid for Sales Area & &. Process the error message and change the delivering plant, sales area or material or reject the customer's request.

Adjust Customer's Dock Date with Transit Time

Preconditions The offset is performed under the following conditions:
  No PROFIT/ATP Commits on ESO (Commits present implies ESO is from the OEMLS Interface Logical message ORDERS and code 9BD)
  Customer's line item provided
  Local EDI configuration set to Customer's dock date (ZEDITCFG-ZEDIDATQAL='D')
  Internal material number determined
  Delivering plant determined
  Ship-to determined
    First from line level on ESO (E1EDPA1)
    Second from header level on ESO (E1EDKA1)
    Third, if logical message ORDCHG or DELINS, then from sales document Audits The customer's request dock date is offset the transit time for the Ship-to, delivering plant, and material. The transit time number of days is maintained using trx ZEDI→MasterData→Transit Time Data. The transit times can be maintained (and determined in this order) at the following levels:

Delivering plant, material, Ship-to
    Delivering plant, Ship-to
    Delivering plant Each request date on the ESO is adjusted with the transit time offset. Request date in SAP always represents IBM ship date.

Adjust Minimum Order Quantity (MOQ) and Ship Pack Quantity (SPQ)

Preconditions Adjustment is performed under the following conditions:

Sales Area determined
    Internal material determined
    Line item action code NOT='003' (delete)
    Schedule lines added to ESO by the Order interceptor when bringing forward Open JIT schedules are NOT subject to MOQ/SPQ checks Audits Before MOQ and SPQ checks are performed, the request quantity at the line item level is adjusted to match the sum of all the delivery schedule quantities. The minimum order quantity and ship pack quantity for a material is held at the sales view MVKE, fields AUMNG and SCMG respectively.

MOQ checks are carried out at the material level (line items for the same material are summed). If the request is out of MOQ, then the following domain values from the local EDI configuration table ZEDITCFG-MOQ determines how the quantity is adjusted. This rule can be configured down to the material level:

| Domain Value | Action |
| --- | --- |
| ' ' - Accept as is | Request quantity NOT adjusted |
| 'M' - Manual review | Held for Pseudo-Sales Order Workbench for manual review |
| 'U' - Round up | Request quantity for last line item for material is rounded up to be in MOQ |

SPQ checks are carried out for each schedule line. If the request is out of SPQ, then the following domain values from the local EDI configuration table ZEDITCFG-SPQ determines how the quantity is adjusted. This rule can be configured down to the material level:

| Domain Value | Action |
| --- | --- |
| ' ' - Accept as is | Request quantity NOT adjusted |
| 'M' - Manual review | Held for Pseudo-Sales Order Workbench for manual review |
| 'U' - Round up | Request quantity rounded up to be in SPQ |
| 'D' - Round down | Request quantity rounded down to be in SPQ |

Pseudo-Sales Order Workbench Message

Message ZV 232. The requested quantity is out of SPQ for line & and schedule &. Process the warning message and change the request quantity to be in SPQ or accept as is.

Message ZV 230. The requested quantity is out of MOQ for line &. Process the warning message and change the request quantity to be within MOQ or accept as is.

Audits Specific by Order Type

Preconditions

None

Audits

The following audits are performed on Rush Orders (SO order type):

If local EDI configuration ZEDITCFG-ZEDIREFBPO is set to true and a reference to a contract is not provided (E1EDK02, qualifiers '005' or '006, field BELNR, then manual review is required.
    If request date<system date, then manual review is required.

Pseudo-Sales Order Workbench Message

Message ZV 366. Rush order requires reference to a contract. Manual review required.

Message ZV 392. Request date is in the past. Manual review required.

Verify Sales Document is NOT in ATP Pipeline from Prior ESO

Preconditions

Audit is performed under the following conditions:
    Logical message ORDCHG or DELINS
    Existing sales order found Audits If the request is to change an existing sales document, then a check is made to see if the sales document is being processed by PROFIT/ATP (ATP results from prior ESO not applied to order). The ESO to ATP Customer Order table ZATPGEN is used for this audit. If an entry is found, then the ESO is held for the Pseudo-Sales Order Workbench.

Pseudo-Sales Order Workbench Message

Message ZV 381. & is being processed by PROFIT/ATP (ESO &), try again later.

Validate Logical Message Code for Change Order

Preconditions Audit is performed under the following conditions:
    Logical message ORDCHG Audits The following logical message codes are not supported by the Order interceptor:
    BPO Change to a Contract Pseudo-Sales Order Workbench Message Message ZV 382. Change to a contract is not supported. The ESO must be marked complete in the Workbench and can not be posted to the application.

Validate if Change is Within Frozen Zone Period

Preconditions Audit is performed under the following conditions:
    Logical message ORDCHG
    Existing sales order found
    Line item action code indicates change or delete Audits If the Customer requests a change to either the date, quantity, or material, then manual review is required. If the change is occurring within the frozen zone period for the material, then the manual review message will also note this condition. The request date and quantity are compared to the order's commit date and quantity if the order is committed; otherwise, the request date and quantity are compared to the order's request date and quantity.

The frozen zone number of days for a material is defined in the local EDI configuration table ZEDITCFG-ZFROZONE. If the material is not configured, then the frozen zone is taken from the Customer/logical message level. The change is considered to be within the frozen zone if the requested date< (system date+frozen zone days).

Pseudo-Sales Order Workbench Message

Message ZV 343. Review changes within frozen zone for & and customer's line item &. Manual review required.

Message ZV 351. Review changes for & and customer's line item &. Manual review required.

Apply Shipments to Changing a Sales Order

Preconditions Audit is performed under the following conditions:
  Logical message ORDCHG
  Existing sales order found
  Line item action code indicates change Audits Shipments are applied on the ESO in segment E1EDP20 field AMENG and are subsequently available for display in the Workbench. In addition, the delta between the request quantity and ship quantity is sent to PROFIT/ATP for commit (and not the request quantity). The shipped quantity for a schedule line is derived from tables VBEP-WMENG minus VBBE-OMENG (request quantity−open quantity=ship quantity). The following audits are also performed:
  Schedule line still open
  Requested quantity from ESO>shipped quantity Pseudo-Sales Order Workbench Message Message ZV 380. Schedule line is no longer open. The ESO must be marked complete in the Workbench and can not be posted to the application.

Message ZV 377. Item &: requested quantity & less than delivered quantity &. The ESO must be marked complete in the Workbench and can not be posted to the application.

Message ZV 277. Customer's line item & has been shipped. The request must be applied manually (Order interceptor does not support shipment consumption logic with multiple request dates). The ESO must be marked complete in the Workbench and can not be posted to the application.

Audits Specific to Create Sales Order with Reference to a Contract

Preconditions Audit is performed under the following conditions:
  Logical message ORDERS
  Reference to contract provided on ESO (E1EDK02 with qualifier '005' or '006' field BELN)

Audits

The following audits are performed when creating a sales order with reference to a contract:
  If reference to contract provided (qualifier '006'), contract must exist
  If reference to contract not provided, then determine contract from referenced contract PO (qualifier '005') using view M_VMVAA
  Ship-to is taken from referenced contract if not provided on ESO
  Ship-to on ESO if provided must match Ship-to on referenced contract
  All materials on ESO are listed on the referenced contract
  If request quantity+prior pulls (using VBFA-RFMNG sales document flow) exceeds open quantity on contract, then manual review required Pseudo-Sales Order Workbench Message Message ZV 364. Contract not found using customer's contract PO. Process the error message and either correct the referenced PO or reject the customer's request.

Message ZV 365. No unique contract could be determined using customer's contract PO. Process the error message and choose the contract from the list of contracts matching the referenced PO.

Message ZV 347. Reference contract & not found for customer &. Process the error message and either correct the referenced contract or reject the customer's request.

Message ZV 348. Material & not found on referenced contract. Process the error message and change the material number or reject the customer's request.

Message ZV 371. Ship-to on ESO does not match Ship-to on referenced contract. Process the error message and change the Ship-to on the ESO or reject the customer's request.

Message ZV 367. Request quantity exceeds open quantity on contract. Manual review required.

Audits Specific to Creating a Contract

Preconditions

Audit is performed under the following conditions:
  Logical message ORDERS and code BPO
  Internal material determined Audits The following audits are performed when creating a contract:
  Same material can only be on contract one time (no duplicates)

Pseudo-Sales Order Workbench Message

Message ZV 383. Material & not unique on contract request.

Audits Specific to Creating a Scheduling Agreement Release

Preconditions

Audit is performed under the following conditions:
  Logical message DELINS
  Existing Scheduling Agreement found
  Line item on Scheduling Agreement determined
  Dates converted from dock to ship date (see Adjust Customer's Dock Date with Transit Time)

Audit

The following fields are added to the ESO if not provided:

| Segment-Field | Description | Rule |
| --- | --- | --- |
| E1EDK09-LABNK | Customer's number for fds/jit release | Generate next number using 'Number__Get__Next', object ZFDSNO or ZJITNO, range '01' |

-continued

| Segment-Field | Description | Rule |
| --- | --- | --- |
| E1EDK09-ABNRA | Customer's number for previous FDS/JIT processed | From VBLB where ABART = '1' for FDS or '2' for JIT and ABRLI = O (current version), field LABNK |

If the release is JIT (E1EDP10-SCREL='02'), then the following addition audits are performed:
Verify that an FDS (Forecast Delivery Schedule) exists in table VDLB where ABART='1' and ABRLI=0
If mode is append (E1EDP10-LABKY='1'), then any open delivery schedules are brought forward and appended as delivery schedules on the ESO (segment E1EDP16). This audit is performed only once. Open schedules are determined by comparing tables VBEP and VBBE. If the schedule is still open (entry is VBBE), then the delivery schedule is brought forward. In addition, any shipments against the delivery schedule are also applied to the ESO (E1EDP16-FZABR) and are subsequently available for display in the Workbench. The delta between the request quantity and ship quantity is sent to PROFIT/ATP for commit. The shipped quantity for a delivery schedule is derived from VBEP-WMENG minus VBBE-OMENG.

The following fields on the ESO are redetermined:

| Segment-Field | Description | Rule |
| --- | --- | --- |
| E1EDK10-ABRAB | Release valid-from date | Earlies request date (E1EDP16-EDATUB) on ESO including those brought forward for JIT |
| E1EDK10-ABRBI | Release valid-to date | Latest request date (E1EDP16-EDATUB) on ESO including those brought forward for JIT |
| E1EDK10-ABHOR | JIT valid-to date | If JIT release, then set to E1EDK10-ABRBI |

Earliest request date (E1EDP16-EDATUB) on ESO including those brought forward for JIT.

Finally, the validity periods (valid-from/to dates) are compared to those on the Scheduling Agreement (VBAK-GUEBG valid-from and VBAK-GUEEN valid-to). If either of the dates fall outside the horizon, then manual review is required.

Pseudo-Sales Order Workbench Message
Message ZV 372. No delivery schedules were provided on the ESO. Reject the Customer's request.
Message ZV 369. Valid from date outside the validity period on Scheduling Agreement. Manual review required.
Message ZV 370. Valid to date outside the validity period on Scheduling Agreement. Manual review required.

Check if Configured for Manual Review

Preconditions

Audit is performed under the following conditions:
Local EDI configuration set to manual review (ZEDITCFG-ZMANREVIEW='1' or '3')

Audits

The local EDI configuration field ZEDITCFG-ZMANREVIW determines if an ESO is held in the Pseudo-Sales Order Workbench for manual review. The rule can be configured down to the material level. The domains are:
' 'No manual review required
'1' Hold for Pseudo-Sales Order Workbench
'2' Block Sales Order and Proposing Acknowledgment
'3' Both Hold for Pseudo-Sales Order Workbench and Block Sales Order and Proposing Acknowledgment Pseudo-Sales Order Workbench Message Message ZV 225. Manual review required.

Apply Updates to ESO

Preconditions

The ESO is Updated if Any Updates are Made by the Order Interceptor.

Audits

The Order interceptor keeps internal tables of fields and segments that need to be updated back on the ESO. This includes new segments, changes or deletes to existing segments. The updates are applied to the ESO data segment in table ESO Data (405) after all the audits are performed and prior to the ESO being passed to subsequent processes, such as Pseudo-Sales Order Workbench or the Pre and Post ATP processes. Before the updates are applied, the original ESO is copied to a new ESO with the status of '70'. Any change to the ESO is noted in the status segment ESO Status (406) with a status of '69'. This gives a full audit trail of changes made by the Order interceptor, such as if the Sales area, internal material and/or delivering plant was added, and so on. Table EDSYN is used during the update process to ensure proper syntax of the ESO. Function module Z_IDOC_Update_Data_Resequence is used to perform the actual table update.

Hold ESO for Pseudo-Sales Order Workbench

Preconditions

The ESO is held in the Pseudo-Sales Order Workbench under the following conditions:
Audit fails or manual review required
Header is NOT rejected (If rejected, already in Workbench and ready to release)
All line items are NOT rejected (If rejected, already in Workbench and ready to release)
Input mode is NOT from Pseudo-Sales Order Workbench (Implies already held in Workbench)

Audits
Before any audits are performed, the Order interceptor builds an internal
table of all the error messages that have been reviewed in the Pseudo-Sales Order Workbench for the given ESO. Messages are communicated by the Order interceptor to the Pseudo-Sales Order Workbench via table ZEDIWMSG. Messages requiring manual review (as opposed to correction) are flagged as reviewed by the Pseudo-Sales Order Workbench when the appropriate action is taken.

The Order interceptor records all error and manual review messages in an internal table which is analyzed to see if the ESO should be held for the Pseudo-Sales Order Workbench. All entries in the communication table ZEDIWMSG owned by the Order interceptor (some messages are also owned by the Post-ATP and Call Transaction Processes) are deleted and rebuilt from the internal table. As the entries are added to ZEDIWMSG, the "reviewed" internal table is cross-referenced and if a match is found, then the message is flagged as already reviewed. By using this technique, the Order interceptor always remembers which messages were reviewed by the User. If the header has been rejected, then no messages are recorded in the Workbench. Likewise, messages specific to a line item are not recorded if the line item has been rejected. This way, the User can Release the ESO even though an error condition may still exist (which requires a header or line level reject).

Each entry added to ZEDIWMSG is also added to the ESO's status table ESO Status (406) with status of 'Z I' (Message from Order interceptor) provided the message has not already been reviewed. The ESO status is then set to 'Z2', held for Pseudo-Sales Order Workbench (unless already 'Z2').

If the Input Mode is not from the Pseudo-Sales Order Workbench (implies Work Item already exists), a Pseudo-Sales Order Workbench Work Item is created using function module 'Z_Workflow_Error_Create'. The Work Item text consists of order type and action, delivering plant, internal material, Pseudo-Sales Order and Customer name.

Reject and Acknowledge ESO without Posting to Application

Preconditions The ESO is rejected and acknowledged under the following conditions:
  Header is rejected in the Pseudo-Sales Order Workbench (segment Z1EDK01, field ZREJCODE non blank)
  All line items are rejected in the Pseudo-Sales Order Workbench (segment E1EDP01, field ABGRU non blank)
  Input mode is NOT from Pseudo-Sales Order Workbench (Implies already held in Workbench)

Audits

If the header is rejected or all line items are rejected from the Pseudo-Sales Order Workbench, then an outbound acknowledgment ESO is created using function module 'Z_ACK_REJ_PO'. This ESO contains the customer's original request along with reason codes and description of why the request was rejected. The inbound ESO is then marked complete (status set to 'Z6') and not posted to the application.

Pseudo-Sales Order Workbench Message

Error messages from 'Z_ACK_REJ_PO' are recorded for the Pseudo-Sales Order Workbench.

Pre-ATP Processing

Preconditions

The ESO is sent to Pre-ATP (function module 'Z_IDOC_INPUT_PRE_ATP') under the following conditions:
  No error or manual review message (unreviewed) exist for ESO
  ESO is not rejected or marked complete or routed to OEMLS (111)
  Input method not from Customer PO Workbench (607)
  Order type defined in table ZATPO Note: No check is made to see if material is an ATP part Audits
  The following functions are performed before the request is sent to Z_IDOC_INPUT_PRE_ATP:
    If the logical message is DELINS (Scheduling Agreement) and request is a JIT release, then the open FDS is added to the delivery schedule internal table that is passed to ATP; likewise, if the request is a FDS release, then the open JIT is added to the delivery schedule internal table. Notice that these schedules are not applied to the ESO.

Note: PROFIT/ATP requires both the FDS and JIT schedules in order to perform its ATP logic The following structures and internal tables are then constructed from the ESO and existing sales order:
  Header structure XVBAK representing header data on ESO
  Header structure YVBAK representing header data on existing order
  Line item table XVBAP representing line items on ESO
  Line item table YVBAP representing line items on existing order
  Delivery schedule table XVBEP representing deliveries on ESO
  Delivery schedule table YVBEP representing deliveries on existing order
  Partner table XVBPA representing partner functions on ESO (both header and line items)
  Partner table YVBAP representing partner functions on existing order
  Delivery schedule commit table XVBEP2 representing commits on ESO supplied from external interface such as OEMLS (111)

Extra details:
  The order number field VBELN in the tables and structures listed above is determined as follows:
    For logical message ORDERS and Input Method from the WEB→'WB+last 8 digits of ESO number
    For logical message ORDERS and all other Input Methods→'ED+last 8 digits of ESO Number
    For logical message ORDCHG or DELINS→use existing order number
  Line items rejected in the Customer PO Workbench (and entire request not rejected) are NOT sent to ATP
  Line items canceled by Customer are denoted with "D" in field XVBEP-UPDKZ
  Delivery schedule types are denoted in field XVBEP-ABART

| ' ' | Normal |
| '1' | FDS |
| '2' | JIT |

Table ZATPGEN is updated to cross-reference the ESO number with the VBELN number sent to ATP. The key values are:
  ZATTRIB='ZEDIATP'
  ZPARAM=Order Number
  ZRECID=123456
  ZRECVALUE=ESO Number The request is then sent to Pre-ATP (function module Z_IDOC_INPUT-PRE-ATP (313)) which populates the ATP/SAP Interface table ZATPDEM with the information supplied in the API (see structures and tables above) and interfaces to ATP as instructed in the API via MQSeries. Parameter TRIGGER ATP ('x' send to ATP) controls if the request is to be sent to ATP. This is the case for all ESOs except when commits are present on the ESO (from OEMLS (111), for example). Parameter RESEND_COMMIT is only used when an ESO is rejected by Customer and the request has been committed by ATP and the logical message is ORDCHG or DELINS. When RESEND_COMMIT='x', then the commits on the existing order are resent to ATP to replace the latest commits vs RESEND_COMMIT=' ' which means requesting a commit. Parameter TRIGGER_ZMOM103 tells ATP to raise an event to trigger the Restart ESOs in Z4 Status (ZMOMI03) module (319) upon returning the ATP results. If the link to ATP is not responding in a timely manner (currently set to 60 seconds), the Pre-ATP function is re-executed with the trigger set to 'x'. The ESO's status is set to 'Z4' and processing of the ESO is suspended until the Restart ESOs in Z4 Status (ZMOMI03) module (319) are triggered.

After Pre-ATP is performed, the interface table ZATPDEM is polled every 3 seconds to see if the results from ATP have been posted. If all delivery schedules on the ESO have a response, then Post-ATP (Z_IDOC_INPUT_POST_ATP) is performed. The loop is repeated until all delivery schedules have a response or time limit exceeded (up to 20 times or 1 minute elapsed time). If the time limit is exceeded, then the Pre-ATP function is re-executed with TRIGGER_ZMOMI03 set to 'x'. When the Restart ESO in Z4 Status ZMOM103 module 319 is triggered, then Post-ATP is performed to pick back up the processing of the ESO.

Pseudo-Sales Order Workbench Message

Error messages from the Z_IDOC_INPUT_PRE_ATP module (313) are recorded for the Customer PO Workbench module (607).

Pseudo-Sales Order Workbench Description

The Pseudo-Sales Order Workbench 106 is a tool to allow the Customer Service Representative (CSR) the ability to review and/or change a customer's inbound purchase order before it is processed into an SAP Sales Order. One of the main advantages is that the customer's order request is presented in a pseudo-sales order. There are currently four supported scenarios by the workbench and order interceptor:

1. Create and changes of SAP Sales Orders (ie, VA01, VA02)
2. Create and changes of SAP Sales Orders with reference to a SAP Contract (ie VA01, VA02)
3. Changes of SAP Scheduling Agreement Outline Agreement (ie, VA32)
4. Create SAP Contract Agreement Outline Agreement (i.e., VA41)

There is some initial configuration to be done prior to using the workbench. This configuration is not covered in this document, such as: to configure a specific customer to always manually review its orders. The CSR has the capability to branch to selected configuration processes from the workbench. This will be covered in detail later in this document. The order interceptor documentation, above, explains the customer-specific rules and configuration.

The CSR can also reject the entire customer order or only reject specific line item(s) of the order. There is also functionality to "accept as is" if the quantities are out of MOQ or SPQ. One of the major functions of the workbench is to review and/or correct all of the error messages associated with an inbound order. All the corrections will be made to the ESO data which is the input to the SAP Sales Order create/change processes. Once the data has been changed, it must be saved before proceeding to the next screen and/or returning back to the previous screen. The following list represents the type of data fields that are allowed to be modified:

Sales Area Data
    Sales Organization, Distribution Channel, Division
    Sales Group, Sales Office
External Partner Number (i.e., ship-to, bill-to, etc)
IBM Internal/SAP Material Number
Delivery Plant
Requested Date and Date Format
Requested Time
Requested Quantity
Scheduling Agreement Current & Previous release numbers
Scheduling Agreement search criteria Other data fields that may be corrected due to an error will include the customer's PO number, the customer's PO Line Item number, the ESO Action Code for the line item, and others as the workbench grows with more function.

Once all errors have been corrected/reviewed, you then "Release to Sales Doc" for follow-on processing to create/change a SAP Sales Order. If for some reason the SAP Sales Order create/change fails, it will appear in the workbench with a message "Call transaction VA01 failed . . . Press HELP (?) for instructions". At that time the CSR should following the instruction(s) on how to determine the error causing the transaction to fail.

FIG. 6 shows a preferred embodiment of a screen from the workbench to show the "pseudo-sales order" view.

Pseudo-Sales Order (Pre-Sales Order) Overview Screen

Figure 7:
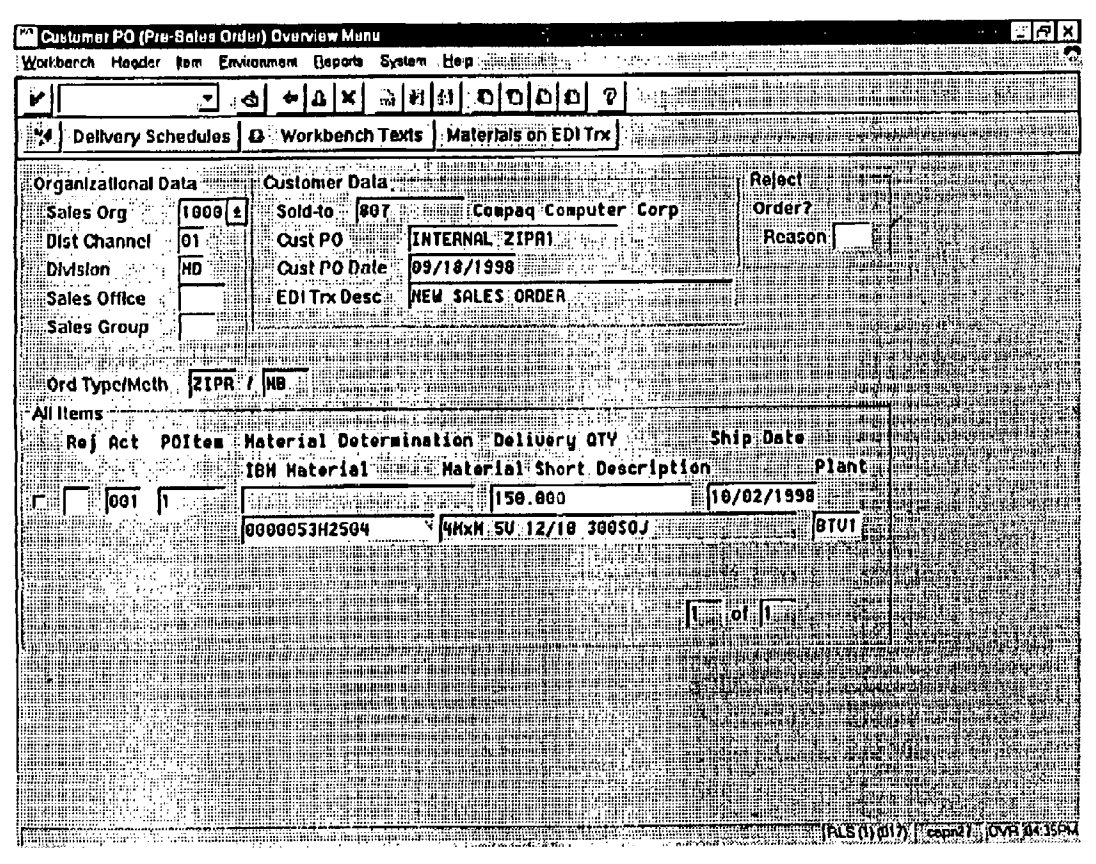

As shown in FIG. 7, the customer PO (pre-sales order) overview screen contains all of the header and line item data from the inbound customer PO. The screen is broken into data groupings to assist the CSR in determining the sales area data, and key customer data such as the sold-to customer number, the customer's PO number, the customer PO date, the type of transaction (850 new or 860 change), and the existing SAP Sales Order number. Next are all of the items which are scrollable to page down and up.

Depending on the error message or if you hit the "Overview" pushbutton, certain fields are modifiable. If the date or quantity on the item level are changed and the inbound ESO had one delivery schedule, the data on the delivery schedule would also change. If there were multiple delivery schedules, the item level date and quantity fields will NOT be modifiable.

If a user chose to reject the entire order, the customer PO (pre-sales order) overview screen is where the reject reason code would be entered.

If PROFIT Commit data is present, the CSR can not change any data because the dates and quantities are already committed for that plant.

Overview Menu Functions

| FUNCTION | FUNCTION DESCRIPTION |
| --- | --- |
| Save | Once you have changed data, you have the option of saving it on the inbound ESO before leaving this screen. If you save data on any screen, "Data SAVED on ESO xxxxxxxxxxxxxxxx" message will be received, where the x's are the actual ESO number. |
| Partner | Allows the CSR to view all <u>header</u> and item <u>level</u> partner segments of the inbound ESO. If needed, changes can be made and saved. |
| PROFIT Commits | Allows the CSR to view the PROFIT committed dates and quantities as well as the requested dates and quantities. Anytime PROFIT commit data is present on the order, no fields are allowed to change. |

| FUNCTION | FUNCTION DESCRIPTION |
|---|---|
| OEMLS Data | Allows the CSR to view the OEMLS data that was on the ESO. This data includes the customer PO number, IPR number, the IBM supplier location code, and the IBM ship to location code. |
| Delivery Schedules | Allows the CSR to view/change the dates and quantities at the delivery schedule level. There could be multiple delivery schedules per item. Other key data is also displayed at this level such as the MOQ and SPQ quantities for that material. You may use the checkbox to view that specific item's delivery schedules or simply hit the Delivery Schedules pushbotton to page through each one. |
| Materials on EDI Trx | A popup window displays all the material number(s) that existed on the inbound EDI transaction. It also shows what kind of material number it is in terms of customer's material number, Vendor's material number, changeable/catalog material number, etc. |
| EDI Local Config | This functions allows the CSR to branch to the local EDI configuration screens to add/change configuration data. This same set of options may also be invoked by issuing transaction ZEDI. The options branch to the specific config tables/data:<br>By Cust/Msg/Material - config data keyed by sold-to customer number, logical message (such as ORDERS and ORDCHG), message code (indicating specific internal customer like Ireland), and/or material number. This is to configure each customer's PO to be held in the workbench based on specific indicators such as manual review, out of MOQ/SPQ, allow line item rejects, etc.<br>By Customer - config data keyed by sold-to customer to determine inbound transaction processing rules such as use the customer's dock date or ship date as well as to use the customer's material number or the IBM catalog number.<br>Int<>Ext Sold-To - config data keyed by customer number to determine the internal customer number from external, ISA, or GS numbers as well as the specific partner function code.<br>Header Reject Codes - config data keyed by reject reason code for specific header level reject reason descriptions |
| Sales Order Display | Allows the CSR to branch to native SAP Sales Order Display processing via transaction VA03. If the existing Sales Order is known, it will automatically use that sales order number. |
| Sched Agreement Disp | Allows the CSR to branch to native SAP scheduling Agreement Outline Display processing via transaction VA33. If the existing Scheduling Agreement is known, it will automatically use that sched agreement number. |

| FUNCTION | FUNCTION DESCRIPTION |
|---|---|
| Contract Agrmnt Disp | Allows the CSR to branch to native SAP Contract Agreement Outline Display processing via transaction VA43. |
| Back, Exit, Cancel | Returns you to the previous screen. If you have modified any data and have not saved it, it will provide you with a "Updates Pending" pop-up menu asking to "go back and SAVE the data?". You may reply YES to return to the screen where the changes were made for you to issue a SAVE; reply NO or CANCEL to return to the previous screen without saving any data. |

Pseudo-Sales Order (Pre-Sales Order) Delivery Schedules Screen

This screen, as shown in FIG. 7, allows the CSR to review/change all the delivery schedules for a line item. Both the date and quantity are modifiable fields. If there are multiple delivery schedules, these will be scrollable via the page up and page down. Please note that if you change one or more of the delivery schedules, the workbench will automatically accumulate the total to be updated on the item quantity field. The CSR will be notified via an information message if this occurs. This screen also allows the CSR to correct or accept quantities that are out of MOQ or SPQ. Both the "SAVE" and "SAVE As Is" work the same way by saving whatever value is currently in the quantity field.

Delivery Schedules Functions

| FUNCTION | FUNCTION DESCRIPTION |
|---|---|
| Save of SAVE_As_IS | Once you have changed data, you have the option of saving it on the inbound ESO before leaving this screen. If you save data on any screen, you should receive a message "Data SAVED on ESO xxxxxxxxxxxxxxxx", where the x's are the actual ESO number. |
| Next Item | If you did not select a single item's delivery schedule to be displayed, the pushbutton will page through each line item available (or that contains a delivery schedule) to display the delivery schedules data for review/change. |
| PROFIT Commits | Allows tho CSR to view the PROFIT committed dates and quantities as well as the requested dates and quantities. Anytime PROFIT commit data is present on the order, no fields are allowed to change. |
| Sales Order Display | Allows the CSR to branch to native SAP Sales Order Display processing via transaction VA03. If the existing Sales Order is known, it will automatically use that sales order number. |
| Material Master Disp | Branches to the native SAP Material Master Display transaction MM03. You must select the item for which material you want to display via the check box. |

-continued

| FUNCTION | FUNCTION DESCRIPTION |
|---|---|
| Customer Master Disp | Branches to the native SAP Customer Master Display transaction VD03. It will automatically use the sold-to customer number, and sales area data for the VD03 transaction. |
| Master Sales View | Branches to the native SAP Material Master Display transaction MM03 and chooses the sales view data automatically. Here the CSR may see all the sales view data such as MOQ SPQ values. |
| Back, Exit, Cancel | Returns you to the previous screen. If you have modified any data and have not saved it, it will provide you with a "Updates Pending" pop-up menu asking to "go back and SAVE the data?". You may reply YES to return to the screen where the changes were made for you to issue a SAVE; reply NO or CANCEL to return to the previous screen without saving any data. |

Reject Acknowledgment Flow and Description

The reject acknowledgment process shown in FIG. 4 is now explained in greater detail. The reject acknowledgment system 107 takes an inbound ESO and creates a corresponding ESO containing reject codes and appropriate values. It can be used to reject incoming ESO's with types of sales orders (850), sales order change (860), or forecasts (830).

An inbound ESO 401 is rejected from the sales order interceptor workbench by entering a reject code for the ESO at a header level. The values that are sent in the reject acknowledgment can be based on the inbound ESO values for new sales orders or based on existing data in SAP for rejected change orders. This configuration is set in table ZEDITCFG (field ZREJMETHOD). If the outbound ESO is built based on taking the original values, a reject segment (Z1EDK01) containing the reject code and description is taken from the edited ESO and appended to the outbound reject acknowledgment ESO. The final step is to update the ESO reconciliation table (ZEDIACKR) for the incoming ESO with the outbound ESO number.

The reject acknowledgment system allows the response to the customer without sending the customer's order request to the order processing system.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A system for pre-processing orders before they are transmitted to an order processing system, comprising:
an order interceptor receiving and pre-processing electronic sales order data prior to transmitting to the order processing system, the order interceptor being capable of adding, changing and deleting electronic sales order data, wherein changes to an electronic sales order are logged so as to provide an audit trail of activity;
an interface system receiving the electronic sales order data from the order interceptor and performing an availability check, wherein the availability check determines the portions of the electronic sales order data that can be satisfied; and
means for transmitting at least a portion of the electronic sales order data to the order processing system for order processing.

2. The system of claim 1, wherein the order interceptor comprises:
means for translating the electronic sales order data to an internal format of the order interceptor;
means for determining if an availability check is required;
means for transmitting at least a portion of the electronic sales order data; means for determining if there are any processing problems associated with the electronic sales order data; and
means for processing the electronic sales order data in accordance with business rules.

3. The system of claim 1, further comprising a workbench receiving electronic sales order data that contains errors or is incomplete.

4. The system of claim 3, wherein the workbench comprises:
a) means for displaying electronic sales order data that contains errors or is incomplete;
b) means for displaying error messages associated with the electronic sales order data of step a); and
c) means for correcting, editing, and updating the at least one database containing electronic sales order data.

5. The system of claim 4, wherein the workbench further comprises: means for displaying the status of the electronic sales order data;
means for determining if the configuration rules are satisfied; and
means for indicating to the order interceptor that at least a portion of the electronic order data is rejected.

6. The system of claim 1, further comprising a reject acknowledgment system receiving an indication from the order interceptor that at least a portion of the electronic sales order data has been rejected.

7. The system of claim 6, wherein the reject acknowledgment system comprises:
means for updating the at least one database to indicate the portions of the electronic order data that have been rejected.

8. The system of claim 7, wherein the reject acknowledgment system further comprises:
means for determining if the electronic sales order data was received via a transmission from the World Wide Web; and
means for updating the at least one database in either an ESO format or an SAP format.

9. The system of claim 1, wherein the order interceptor receives the electronic sales order data in a standard Electronic Data Interchange (EDI) format.

10. The order interceptor system of claim 1, wherein the system is an SAP system.

11. The order interceptor system of claim 1, wherein the order interceptor determines if any processing problems are present and, if so, creates a workflow item that can be reviewed and modified prior to transmitting to the order processing system.

12. The order interceptor system of claim 1, wherein the order interceptor validates an accuracy of the electronic sales order at the different stages prior to transmitting to the order processing system.

13. The order interceptor system of claim 1, wherein the order interceptor processes data by customer specific business rules prior to transmitting to the order processing system.

14. The order interceptor system of claim 13, wherein the order interceptor ensures all attributes are present and accurate in the electronic sales order prior to transmitting to the order processing system.

15. The order interceptor system of claim 1, wherein the order interceptor allows correction of problems in the electronic sales order in a prior to transmitting to the order processing system.

16. The order interceptor system of claim 1, wherein the electronic sales order data is a proposed customer order.

17. A system for pre-processing orders before they are transmitted to an order processing system, comprising:

an order interceptor receiving and pre-processing electronic sales order data prior to transmitting to the order processing system, wherein pre-processing the electronic sales order includes splitting the electronic sales order into at least two separate requests prior to transmitting to the order processing system;

an interface system receiving the electronic sales order data from the order interceptor and performing an availability check, wherein the availability check determines the portions of the electronic sales order data that can be satisfied; and means for transmitting at least a portion of the electronic sales order data to the order processing system for order processing.

* * * * *

UNITED STATES PATENT AND TRADEMARK OFFICE
CERTIFICATE OF CORRECTION

| | | |
|---|---|---|
| PATENT NO. | : 7,606,742 B2 | Page 1 of 1 |
| APPLICATION NO. | : 09/303368 | |
| DATED | : October 20, 2009 | |
| INVENTOR(S) | : Bright et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 630 days.

Signed and Sealed this

Twelfth Day of October, 2010

David J. Kappos
*Director of the United States Patent and Trademark Office*